US011922072B2

(12) United States Patent
Chang et al.

(10) Patent No.: US 11,922,072 B2
(45) Date of Patent: *Mar. 5, 2024

(54) SYSTEM SUPPORTING VIRTUALIZATION OF SR-IOV CAPABLE DEVICES

(71) Applicant: H3 Platform Inc., New Taipei (TW)

(72) Inventors: Chin-Hua Chang, Taichung (TW); Yao-Tien Huang, Zhudong Township (TW)

(73) Assignee: H3 Platform Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,093

(22) Filed: Sep. 12, 2022

(65) Prior Publication Data
US 2023/0044609 A1 Feb. 9, 2023

Related U.S. Application Data

(63) Continuation of application No. 17/360,988, filed on Jun. 28, 2021, now Pat. No. 11,467,776.

(51) Int. Cl.
*G06F 3/06* (2006.01)
*G06F 13/42* (2006.01)

(52) U.S. Cl.
CPC ............ *G06F 3/0664* (2013.01); *G06F 3/061* (2013.01); *G06F 3/0679* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| 2014/0281040 | A1* | 9/2014 | Liu ........................... G06F 9/50 710/3 |
| 2015/0149661 | A1 | 5/2015 | Kanigicherla et al. |
| 2016/0283428 | A1* | 9/2016 | Guddeti ............. G06F 13/4022 |
| 2018/0048559 | A1 | 2/2018 | Chou |
| 2018/0181519 | A1* | 6/2018 | Cheng ..................... G06F 13/16 |
| 2019/0114196 | A1* | 4/2019 | Aggarwal ............. G06F 3/0631 |
| 2021/0019070 | A1 | 1/2021 | Karr et al. |

* cited by examiner

*Primary Examiner* — Elias Mamo
(74) *Attorney, Agent, or Firm* — Fish & Richardson P.C.

(57) ABSTRACT

An apparatus supports single root input/output virtualization (SR-IOV) capable devices. The apparatus includes input/output ports, and SR-IOV capable PCIe devices. Each SR-IOV capable PCIe device has one or more namespaces or controller memory buffers. The SR-IOV capable PCIe device provides one or more physical functions and virtual functions that can access the one or more namespaces or controller memory buffers. A PCIe switch controller communicates with host servers coupled to the input/output ports, and assigns one or more virtual functions to each host device, and enables the host devices to access one or more namespaces or controller memory buffers through the assigned virtual functions. The PCIe device is configured to attach one or more namespaces or one or more partitions of one or more controller memory buffers to each virtual function, set at least one namespace or controller memory buffer to a shared state and allow different host devices to access the same namespace or controller memory buffer using respective assigned virtual functions.

20 Claims, 28 Drawing Sheets

SYSTEM SUPPORTING VIRTUALIZATION OF SR-IOV CAPABLE DEVICES

CROSS-REFERENCE TO RELATED APPLICATION

This application is a continuation of, and claims priority to, U.S. patent application Ser. No. 17/360,988, filed on Jun. 28, 2021, the entire content of which is incorporated by reference.

TECHNICAL FIELD

This subject matter is generally related to systems supporting virtualization of SR-IOV capable devices, e.g., SR-IOV capable NVMe solid state drives.

BACKGROUND

For example, a computer system can include a non-volatile storage device (e.g., solid state drive (SSD)) that allows data to be persistently stored when the power is turned off. A central processing unit (CPU) can access the solid state drive through a peripheral bus, such as a peripheral component interconnect express (PCIe) bus. The NVM Express™ (NVMe™) specification defines how host software communicates with non-volatile memory across a PCI Express® (PCIe®) bus. The NVMe over Remote Direct Memory Access (RDMA) specification specifies how hosts can access shared NVMe SSDs through RDMA-capable Ethernet network interface cards (NICs). The single root input/output virtualization (SR-IOV) interface is an extension to the PCIe specification that allows a device, such as a network adapter, to separate access to its resources among various PCIe hardware functions. The functions can include, e.g., a PCIe Physical Function (PF) that is the primary function of the device and advertises the device's SR-IOV capabilities, and one or more PCIe Virtual Functions (VFs). Each virtual function can be associated with the device's primary function. A virtual function can share one or more physical resources of the device, such as a memory and a network port, with the physical function and other virtual functions on the device.

SUMMARY

In a general aspect, an apparatus supporting virtualization of non-volatile storage devices includes: a plurality of input/output ports; and one or more block-addressable non-volatile storage devices. Each block-addressable non-volatile storage device supports single-root input/output virtualization, each block-addressable non-volatile storage device has a plurality of namespaces, each namespace represents an amount of storage space of the storage device, and the block-addressable non-volatile storage device enables the namespace to be attached to and accessed by one or more physical functions and a plurality of virtual functions. The apparatus includes a switch device configured to communicate with a plurality of host devices electrically coupled to the input/output ports. The switch device is configured to assign one or more virtual functions to each host device, and enable the host devices to access the namespaces using the assigned virtual functions. The block-addressable non-volatile storage device includes a storage device controller that is configured to set a first namespace to a private state during a first period of time, and set the first namespace to a shared state during a second period of time. When the first namespace is set to the private state, the first namespace is accessible to a single virtual function, and when the first namespace is set to the shared state, the first namespace is accessible to multiple virtual functions. The apparatus includes a management central processor unit (CPU); and one or more memory devices storing management software that when executed by the management CPU causes the management CPU to configure the switch device to enable the host devices to access the namespaces using the virtual functions.

Implementations can include one or more of the following features. The switch device can include a PCIe switch, and the one or more block-addressable non-volatile storage devices can include solid state drives.

The solid state drives can be NVM Express® solid state drives.

The PCIe switch can communicate with the host devices through PCIe links.

At least one of the host devices can include at least one of a personal computer or a server computer, the at least one of a personal computer or a server computer can include a PCIe interface card that communicates with the PCIe switch through the PCIe link.

The management CPU can be designed to receive storage requirements associated a first host device, configure the one or more block-addressable non-volatile storage devices according to the storage requirements, including generating a first namespace according to the storage requirements, attaching the first namespace to one or more virtual functions, and assigning one or more virtual functions to the first host device.

The PCIe switch can be configured to provide a PCIe device tree to the first host device, and the PCIe device tree can include information about the assigned one or more virtual functions.

Information about the first namespace and the one or more virtual functions assigned to the first host device can be stored in the one or more memory devices.

The information about the first namespace and the one or more virtual functions assigned to the first host device can be maintained in the one or more memory devices when the first host device is rebooted, and after the first host device is rebooted, the PCIe switch can be configured to provide the PCIe device tree to the first host device, and the PCIe device tree can include the information about the assigned one or more virtual functions.

The apparatus can include two or more switch devices and two or more block-addressable non-volatile storage devices that support single-root input/output virtualization. Each switch device can enable a set of host devices to access a set of virtual functions supported by the block-addressable non-volatile storage devices.

Each block-addressable non-volatile storage device can include a storage device controller, and the management software when executed by the management CPU can cause the management CPU to configure the two or more switch devices and the two or more storage device controllers to enable the host devices to access namespaces of the block-addressable non-volatile storage devices using the virtual functions.

In another general aspect, a system include the apparatus described above, further including the host devices. Each host device includes a central processing unit and a local switch device. The system includes communication links between the local switch devices of the host devices and the input/output ports of the apparatus. Each host device includes virtual machines, and each virtual machine accesses a namespace in the block-addressable non-volatile storage device through the local switch device of the host device, the switch device of the apparatus, and a communication link between the local switch device of the host device and the switch device of the apparatus.

Implementations can include one or more of the following features. The local switch device can include a PCIe switch. The switch device of the host device can include a PCIe switch of the host device, and the communication link between the local switch device of the host device and the switch device of the apparatus can include a PCIe link.

In another general aspect, an apparatus supporting single root input/output virtualization (SR-IOV) capable devices includes: a plurality of input/output ports; and one or more single root input/output virtualization (SR-IOV) capable PCIe devices. Each SR-IOV capable PCIe device has at least one of (i) one or more namespaces, or (ii) one or more controller memory buffers. Each namespace represents an amount of storage space of the SR-IOV capable PCIe device, each controller memory buffer represents a memory space of the SR-IOV capable PCIe device, and the SR-IOV capable PCIe device provides one or more physical functions and a plurality of virtual functions that can access the at least one of (i) one or more namespaces, or (ii) one or more controller memory buffers. The apparatus includes a PCIe switch configured to communicate with a plurality of host devices electrically coupled to the input/output ports. The PCIe switch is configured to assign one or more virtual functions to each host device, and enable the host devices to access at least one of (i) one or more namespaces, or (ii) one or more controller memory buffers, through the assigned virtual functions. The SR-IOV capable PCIe device is configured to attach at least one of (i) one or more namespaces, or (ii) one or more partitions of one or more controller memory buffers to each virtual function, set at least one of (i) at least one namespace, or (ii) at least one partition of at least one controller memory buffer, to a shared state and allow different host devices to access at least one of (i) the same namespace, or (ii) the shared partition of the controller memory buffer, using respective assigned virtual functions.

Implementations can include one or more of the following features. The apparatus can further include: a management central processor unit (CPU); and one or more memory devices storing management software that when executed by the management CPU causes the management CPU to configure the switch device and the PCIe device to enable the host devices to access at least one of (i) the one or more namespaces, or (ii) the one or more controller memory buffers, using the virtual functions.

Each single root input/output virtualization capable device can include at least one of an NVMe solid state drive, a redundant array of independent disk (RAID) device, a field programmable gate array (FPGA) device, a network interface card, or a graphics processing unit (GPU) card.

Each SR-IOV capable PCIe device can include one or more namespaces, the SR-IOV capable PCIe device can provide one or more physical functions and a plurality of virtual functions that can access the one or more namespaces. The PCIe device can include a controller that is configured to assign one or more namespaces to each virtual function, and enable the host devices to access the one or more namespaces through the assigned virtual functions.

Each SR-IOV capable PCIe device can include one or more controller memory buffers, the SR-IOV capable PCIe device can provide one or more physical functions and a plurality of virtual functions that can access the one or more controller memory buffers. The PCIe device can include a controller that is configured to assign one or more controller memory buffers to each virtual function, and enable the host devices to access the one or more controller memory buffers through the assigned virtual functions.

At least one SR-IOV capable PCIe device can include a controller memory buffer that has multiple partitions, the SR-IOV capable PCIe device can provide one or more physical functions and a plurality of virtual functions that can access the partitions of the controller memory buffer. The PCIe device can include a controller that is configured to assign one or more partitions of the controller memory buffer to each virtual function, and enable the host devices to access the one or more partitions of the controller memory buffer through the assigned virtual functions.

The apparatus can include two or more PCIe switches and two or more single root input/output virtualization (SR-IOV) capable PCIe devices that support single-root input/output virtualization. Each SR-IOV capable PCIe device can have at least one of (i) one or more namespaces, or (ii) one or more controller memory buffers, each PCIe switch can enable each of the host devices to access one or more virtual functions supported by the single root input/output virtualization (SR-IOV) capable PCIe devices.

Each single root input/output virtualization (SR-IOV) capable PCIe device can include a device controller, and the management software when executed by the management CPU can cause the management CPU to configure the two or more PCIe switches and the two or more device controllers to enable the host devices to access namespaces and controller memory buffers of the single root input/output virtualization capable PCIe devices using the virtual functions.

In another general aspect, a system includes the apparatus described above, further including the plurality of host devices. Each host device can include a central processing unit and a local switch device. The system includes communication links between the local switch devices of the host devices and the input/output ports of the apparatus. Each host device includes virtual machines, and each virtual machine accesses at least one of a namespace or a controller memory buffer in an SR-IOV capable PCIe device through the local switch device of the host device, the switch device of the apparatus, and a communication link between the local switch device of the host device and the switch device of the apparatus.

Implementations can include the following feature. The input/output ports can include PCIe redrivers configured to condition signals transmitted between the PCIe switch and the host devices.

In another general aspect, a method includes: receiving, at a management central processing unit (CPU), storage requirements from host devices; and configuring one or more block-addressable non-volatile storage devices according to the storage requirements, wherein each block-addressable non-volatile storage device supports single-root input/output virtualization. Configuring the one or more block-addressable non-volatile storage devices includes generating namespaces according to the storage requirements, setting at least one namespace to a shared state, attaching the namespaces to virtual functions, and assigning virtual functions to the host devices. The method includes configuring a switch device to enable the switch device to communicate with the host devices and enable the host devices to access the namespaces by using the assigned virtual functions, including enabling two different host devices to access the same namespace using different respective virtual functions.

Implementations can include one or more of the following features. The method can includes providing a respective PCIe device tree to each host device, and the PCIe device tree can include information about one or more virtual functions assigned to the PCIe device.

The method can include storing the PCIe device trees in one or more memory devices, maintaining the PCIe device trees in the one or more memory devices when one or more host devices are rebooted, and after the one or more host devices are rebooted, providing the respective one or more PCIe device trees to the one or more host devices.

In another general aspect, a method of operating single root input/output virtualization (SR-IOV) capable devices includes electrically coupling a plurality of host devices to input/output ports of a PCIe switch box system. The PCIe switch box system includes: one or more single root input/output virtualization (SR-IOV) capable PCIe devices. Each SR-IOV capable PCIe device has at least one of (i) one or more namespaces, or (ii) one or more controller memory buffers. Each namespace represents an amount of storage space of the SR-IOV capable PCIe device, each controller memory buffer represents a memory space of the SR-IOV capable PCIe device, and the SR-IOV capable PCIe device provides one or more physical functions and a plurality of virtual functions that can access at least one of (i) one or more namespaces, or (ii) one or more partitions of one or more controller memory buffers. The PCIe switch box system includes a PCIe switch configured to assign one or more virtual functions to each host device, and enable the host devices to access at least one of (i) one or more namespaces, or (ii) one or more partitions of one or more controller memory buffers, through the assigned virtual functions. The method includes attaching at least one of (i) one or more namespaces, or (ii) one or more partitions of one or more controller memory buffers to each virtual function; setting at least one of (i) at least one namespace, or (ii) at least one partition of at least one controller memory buffer, to a shared state; and using multiple host devices to access at least one of (i) the shared namespace, or (ii) the shared partition of the controller memory buffer, using respective assigned virtual functions.

Implementations can include the following feature. Each single root input/output virtualization capable device can include at least one of an NVMe solid state drive, a redundant array of independent disk (RAID) device, a field programmable gate array (FPGA) device, a network interface card, or a graphics processing unit (GPU) card.

The details of one or more of the above aspects and implementations are set forth in the accompanying drawings and the description below. Other features, aspects, and advantages will become apparent from the description, the drawings, and the claims.

BRIEF DESCRIPTION OF DRAWINGS

Like reference symbols in the various drawings indicate like elements.

DETAILED DESCRIPTION

Figure 1:
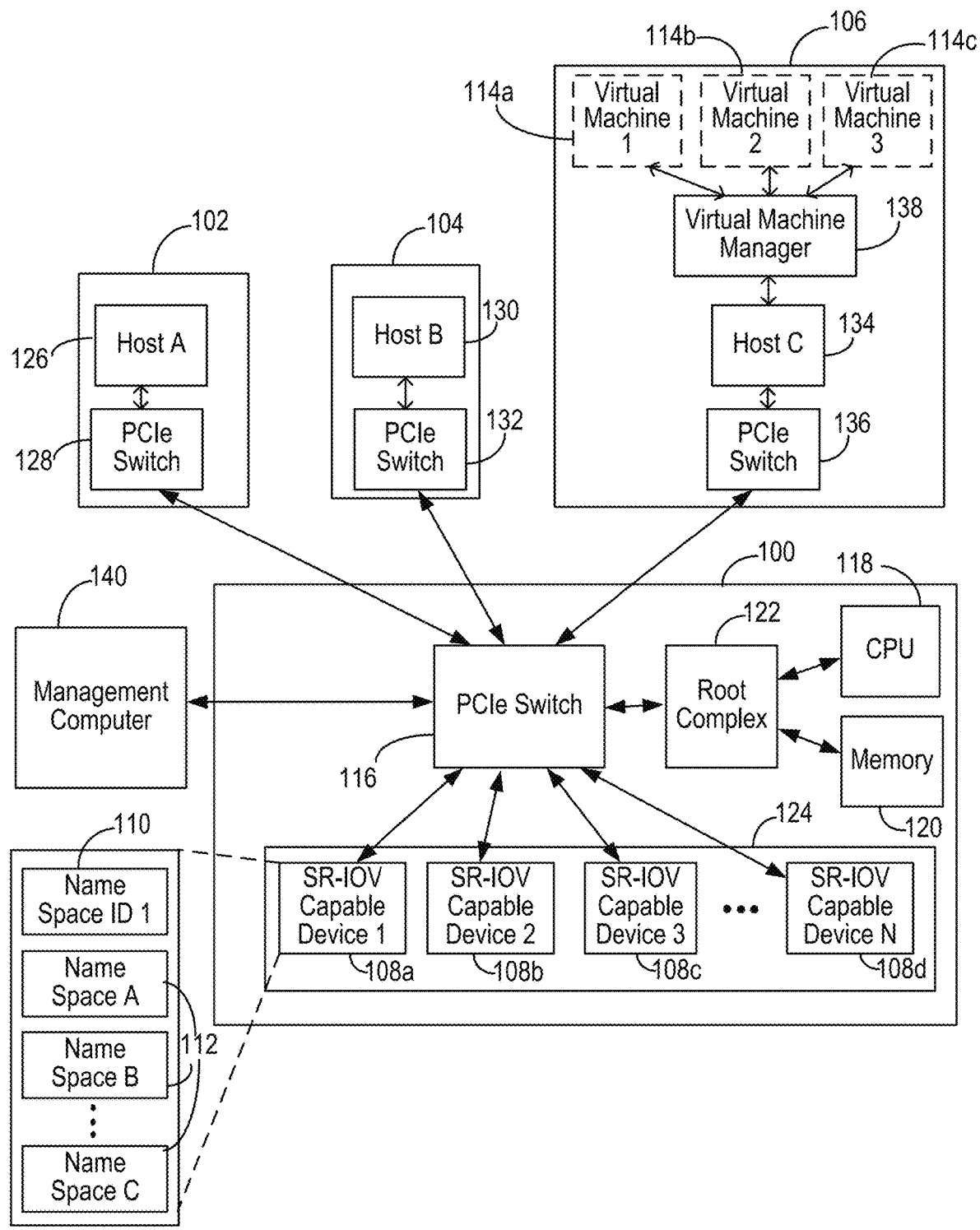
FIGS. 1 to 8 are diagrams of examples of PCIe switch box systems that enable virtualization of PCIe physical and virtual functions

This disclosure describes a novel system that enables multiple host devices to access the virtual functions of SR-IOV capable PCIe devices, including and not limited to solid state drives, redundant array of independent disk (RAID) devices, field programmable gate array (FPGA) devices, network interface cards, and graphics processing units (GPUs), that are installed external to the host devices. In some implementations, the SR-IOV capable PCIe device is an NVMe device that has multiple namespaces, in which each namespace represents an amount of storage space of the SR-IOV capable NVMe device. The single-root input/output virtualization enables the namespace to be accessed by one or more physical functions and a plurality of virtual functions supported by the NVMe device. A controller of the NVMe device attaches one or more namespaces to each of one or more of the virtual functions. A PCIe switch is provided to communicate with multiple host devices and assign one or more virtual functions to each host device, and enable the host devices to access the namespaces using the assigned virtual functions.

In some examples, the SR-IOV capable NVMe device supports sharing of one or more namespaces by multiple virtual functions. The NVMe controller sets one or more namespaces to a "shared" state and attaches the one or more shared namespaces to multiple virtual functions. The PCIe switch assigns the virtual functions to host devices and enables the host devices to access the one or more shared namespaces using the assigned virtual functions. A management central processor unit (CPU) configures the PCIe switch and the NVMe controller to enable the host devices to access the shared namespaces using the virtual functions.

In some implementations, the SR-IOV capable NVMe device includes a controller memory buffer (CMB) that has one or more partitions. The single-root input/output virtualization enables the controller memory buffer to be accessed by one or more physical functions and a plurality of virtual functions supported by the NVMe device. The NVMe controller attaches one or more partitions of the controller memory buffer to each of one or more virtual functions supported by the NVMe device. The PCIe switch assigns one or more virtual functions to each host device, and enables the host devices to access the controller memory buffer using the assigned virtual functions.

In some examples, the SR-IOV capable NVMe device supports sharing of one or more partitions of the controller memory buffer by multiple virtual functions. The NVMe controller sets one or more partitions of the controller memory buffer to a "shared" state and attaches one or more shared partitions of the controller memory buffer to multiple virtual functions. The PCIe switch assigns the virtual functions to host devices and enables the host devices to access the one or more shared partitions of the controller memory buffer using the assigned virtual functions. The management central processor unit configures the PCIe switch and the NVMe controller to enable the host devices to access the one or more shared partitions of the controller memory buffer using the virtual functions. Data can be transferred between the host devices and the one or more shared partitions of the controller memory buffer using direct memory access (DMA) transfers.

In some implementations, the SR-IOV capable PCIe device is a graphics card that includes one or more GPU cores and has graphics memory. The single-root input/output virtualization enables the GPU cores and the graphics memory to be accessed by one or more physical functions and a plurality of virtual functions supported by the graphics card. A controller of the graphics card attaches one or more GPU cores and/or one or more partitions of the graphics memory to each of the one or more virtual functions. The PCIe switch assigns one or more virtual functions to each host device, and enables the host devices to send instructions to the GPU cores and access the graphics memory using the assigned virtual functions.

In some examples, the SR-IOV capable graphics card supports sharing of one or more partitions of the graphics memory by multiple virtual functions. The graphics controller sets one or more partitions of the graphics memory to a "shared" state and attaches one or more shared partitions of the graphics memory to multiple virtual functions. The PCIe switch assigns the virtual functions to the host devices and enables the host devices to access the one or more shared partitions of the graphics memory using the assigned virtual functions. The management central processor unit configures the PCIe switch and the graphics controller to enable the host devices to access the one or more shared partitions of the graphics memory using the virtual functions. Data can be transferred between the host devices and the one or more shared partitions of the graphics memory using direct memory access (DMA) transfers.

In some implementations, the SR-IOV capable PCIe device is a RAID controller card that includes a RAID controller and a cache memory. The RAID controller controls access to a redundant array of independent disks, referred to as RAID storage devices. The single-root input/output virtualization enables the RAID storage devices and the cache memory to be accessed by one or more physical functions and a plurality of virtual functions supported by the RAID controller card. The RAID controller attaches one or more partitions of the cache memory to each of one or more virtual functions provided by the RAID controller card. The PCIe switch assigns one or more virtual functions to each host device, and enables the host devices to access the cache memory using the assigned virtual functions.

In some examples, the SR-IOV capable RAID controller card supports sharing of one or more partitions of the cache memory by multiple virtual functions. The RAID controller sets one or more partitions of the cache memory to a "shared" state and attaches one or more shared partitions of the cache memory to multiple virtual functions. The PCIe switch assigns the virtual functions to host devices and enables the host devices to access the one or more shared partitions of the cache memory using the assigned virtual functions. The management central processor unit configures the PCIe switch and the RAID controller to enable the host devices to access the one or more shared partitions of the cache memory using the virtual functions. Data can be transferred between the host devices and the one or more shared partitions of the cache memory using direct memory access (DMA) transfers.

In some implementations, the SR-IOV capable PCIe device is an FPGA card that includes an FPGA device and embedded memory. The single-root input/output virtualization enables the FPGA device and the embedded memory to be accessed by one or more physical functions and a plurality of virtual functions supported by the FPGA card. An FPGA controller attaches one or more partitions of the embedded memory to each of one or more virtual functions provided by the FPGA card. The PCIe switch assigns one or more virtual functions to each host device, and enables the host devices to access the embedded memory using the assigned virtual functions.

In some examples, the SR-IOV capable FPGA card supports sharing of one or more partitions of the embedded memory by multiple virtual functions. The FPGA controller sets one or more partitions of the embedded memory to a "shared" state and attaches one or more shared partitions of the embedded memory to multiple virtual functions. The PCIe switch assigns the virtual functions to host devices and enables the host devices to access the one or more shared partitions of the FPGA embedded memory using the assigned virtual functions. The management central processor unit configures the PCIe switch and the FPGA controller to enable the host devices to access the one or more shared partitions of the FPGA embedded memory using the virtual functions. Data can be transferred between the host devices and the one or more shared partitions of the FPGA embedded memory using direct memory access (DMA) transfers.

In some implementations, the SR-IOV capable PCIe device is a network interface card (NIC) that includes NIC interfaces and a buffer memory. The single-root input/output virtualization enables the NIC interfaces and the buffer memory to be accessed by one or more physical functions and a plurality of virtual functions supported by the network interface card. A network interface card controller attaches one or more partitions of the buffer memory to each of one or more virtual functions provided by the network interface card. The PCIe switch assigns one or more virtual functions to each host device, and enables the host devices to access the NIC buffer memory using the assigned virtual functions.

In some examples, the SR-IOV capable network interface card supports sharing of one or more partitions of the buffer memory by multiple virtual functions. The network interface card controller sets one or more partitions of the buffer memory to a "shared" state and attaches one or more shared partitions of the buffer memory to multiple virtual functions. The PCIe switch assigns the virtual functions to host devices and enables the host devices to access the one or more shared partitions of the NIC buffer memory using the assigned virtual functions. The management central processor unit configures the PCIe switch and the network interface card controller to enable the host devices to access the one or more shared partitions of the NIC buffer memory using the virtual functions. Data can be transferred between the host devices and the one or more shared partitions of the NIC buffer memory using direct memory access (DMA) transfers.

Figure 28:
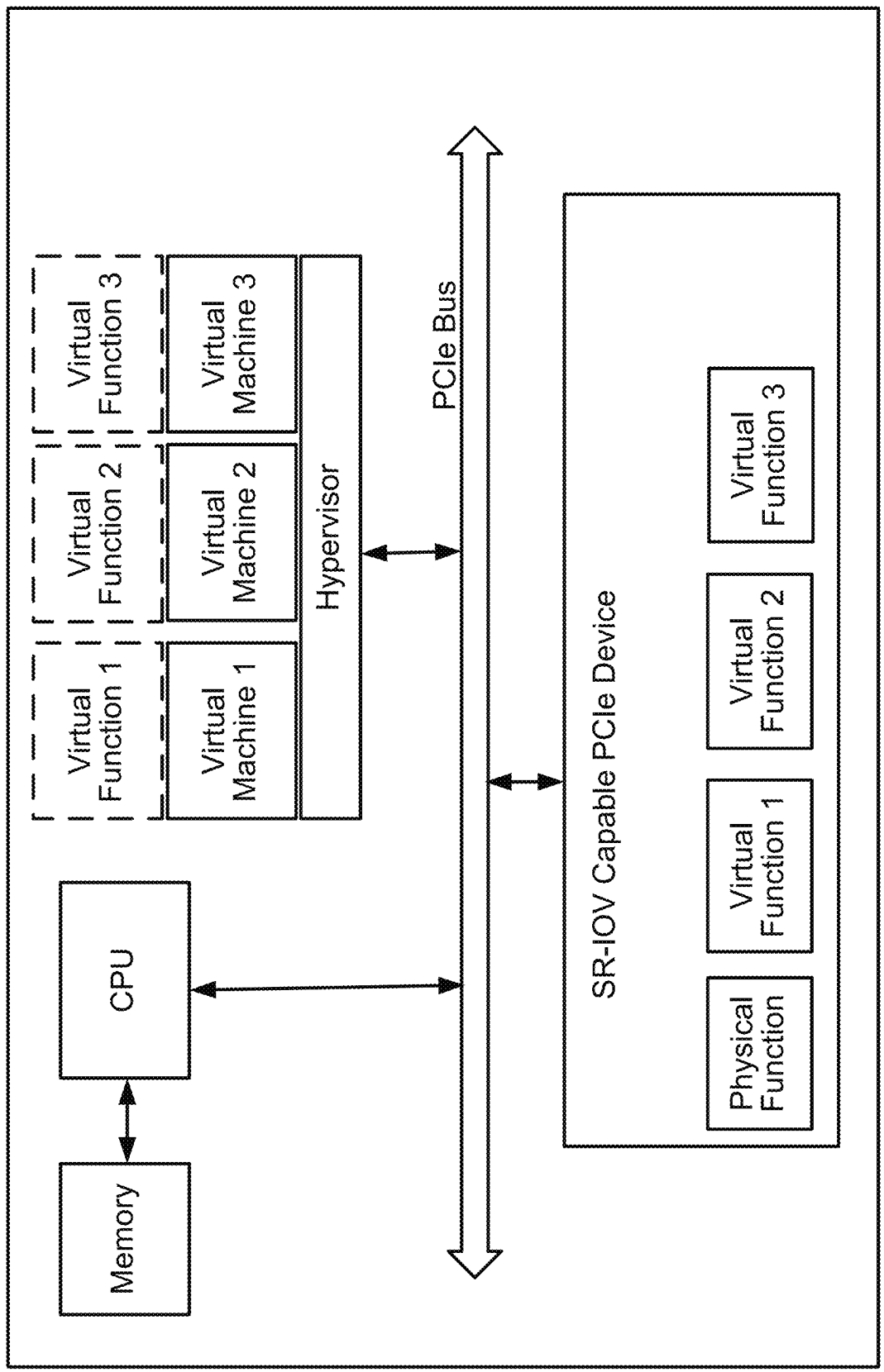
FIG. 28 is a block diagram of an example of a host device that includes a central processing unit, a memory device, an SR-IOV capable PCIe device, a hypervisor, and several virtual machines.

FIG. 28 is a block diagram of an example of a host device that includes a central processing unit, a memory device, an SR-IOV capable PCIe device, a hypervisor, and several virtual machines. The host device can be, for example, a personal computer, a workstation computer, or a server computer. The host device can include a housing or chassis, and a motherboard is install inside the housing. The central processing unit and the memory device are mounted on the motherboard. The motherboard can have PCIe slots, and the SR-IOV capable PCIe device can be inserted into one of the PCIe slots. The SR-IOV capable PCIe device supports a physical function and multiple virtual functions, such as virtual function 1, virtual function 2, and virtual function 3. The host device executes virtualization software, e.g., the hypervisor, and executes multiple virtual machines, such as virtual machine 1, virtual machine 2, and virtual machine 3. For example, the single-root input/output virtualization allows the virtual machine 1 to use the virtual function 1, the virtual machine 2 to use the virtual function 2, and the virtual machine 3 to use the virtual function 3. In this example, the resources of the SR-IOV capable PCIe device can be used by the host device. However, it is difficult for a second host device to use the resources of the SR-IOV capable PCIe device installed in the PCIe slot of the first host device.

In the past, if a company has multiple host devices, such as multiple workstation computers, each workstation computer can install SR-IOV capable PCIe devices so that the virtual machines executing in the workstation computer can access the resources provided by the SR-IOV capable PCIe devices installed within the workstation computer. Sometimes this may not provide the most efficient use of the SR-IOV capable PCIe devices. For example, the virtual machines on a first workstation computer can have low workloads so that some of the SR-IOV capable PCIe devices install in the first workstation computer are idle or not fully utilized, whereas the virtual machines on a second workstation computer can have high workloads that need more resources than the SR-IOV capable PCIe devices installed in the second workstation computer can provide.

The following describes a solution to the above problem by providing a novel external PCIe switch box system that includes SR-IOV capable PCIe devices, connecting the SR-IOV capable PCIe devices to the host devices through PCIe links (e.g., a PCIe switched fabric), and configuring the SR-IOV capable PCIe devices in novel ways to support sharing of computing resources.

FIG. 1 is a diagram of an example of a PCIe switch box system 100 that enables multiple host devices, e.g., 102, 104, 106, to access the virtual functions of SR-IOV resources 124, such as SR-IOV capable PCIe devices, e.g., 108a, 108b, 108c, 108d, collectively referenced as 108, which can include and are not limited to one or more of solid state drives, redundant array of independent disk (RAID) devices, field programmable gate array (FPGA) devices, network interface cards, graphics processing units (GPUs), or any combination of the above. Each SR-IOV capable PCIe device is connected to the PCIe interface and complies with the SR-IOV specification. Each host device can be, e.g., a workstation computer, a server computer, a personal computer, an industrial control computer, or any other computing device that communicates with the PCIe switch box system 100 through a PCIe link. Each host device can support multiple virtual machines, and each virtual machine can access the virtual functions of the SR-IOV capable PCIe devices 108.

In some implementations, each SR-IOV capable PCIe device 108 is an NVMe device that has a namespace identifier 110 and multiple namespaces (e.g., 112a, 112b, 112c, collectively referenced as 112), in which each namespace 112 represents an amount of storage space of the SR-IOV capable NVMe device 108. The single-root input/output virtualization enables the namespace 112 to be accessed by one or more physical functions and a plurality of virtual functions. A controller of the NVMe device 108 attaches one or more namespaces to each of one or more NVMe virtual functions supported by the NVMe device 108. A PCIe switch 116 is provided to communicate with the host devices 102, 104, 106 and assign one or more NVMe virtual functions to each host device, and enable the host devices to access the namespaces using the assigned NVMe virtual functions. The PCIe switch 116 is configured to assign different virtual functions associated with a shared namespace to different host devices and enable the different host devices to access the shared namespace using the assigned virtual functions.

In some implementations, the PCIe switch 116 can be model PEX88096 PCIe Gen4 Switch, available from Broadcom, San Jose, California. For example, the SR-IOV capable PCIe device 108 can be an SR-IOV capable NVMe device. The PCIe switch 116 assigns the virtual functions of the SR-IOV capable NVMe devices to different host ports, so that different hosts can access (e.g., read from and/or write to) the namespace from the same NVMe device. For example, both host A 126 and host B 130 can access the namespace from the same NVMe device. The registers of the PCIe switch 116 can be set to allow the downstream port NVMe virtual function of the PCIe switch 116 to be assigned to any upstream host port of the PCIe switch 116.

By comparison, in a conventional system, the physical and virtual functions of an SR-IOV capable NVMe device can be accessed by a single host. In the conventional system, one of host A 126 or Host B 130 can see and access the physical and virtual functions of the NVMe device. In the conventional system, host A 126 and host B 130 cannot see or access the namespace that belongs to the same NVMe device.

One or more memory devices 120 store management software that when executed by a management CPU 118 causes the management CPU 118 to configure the PCIe switch 116 to enable the host devices to access the namespaces using the virtual functions. The PCIe switch box system 100 includes a root complex device 122 that connects the CPU 118 and the memory devices 120 to the PCIe switch 116.

Each host device includes a central processing unit that communicates with the PCIe switch 116 through a local PCIe switch. For example, the host device 102 includes a host CPU 126 and a local PCIe switch 128, the host device 104 includes a host CPU 130 and a local PCIe switch 132, and the host device 106 includes a host CPU 134 and a local PCIe switch 136. For example, each of the local PCIe switch 128, 132 can be model PEX88032 switch card, available from Broadcom. The PEX88032 switch card can operate in fanout mode. The host A 126 uses the local PCIe switch 128 to access (e.g., read/write) the NVMe namespaces in the PCIe switch box system 100. In this document, the PCIe switch 116 is sometimes referred to as the "switch box PCIe switch," and the PCIe switch 128 or 132 is sometimes referred to as the "host PCIe switch."

For example, the host device 106 includes a virtual machine manager 138 that manages multiple instances of virtual machines (e.g., 114*a*, 114*b*, 114*c*, collectively referenced as 114). The host CPUs 126, 130, and 134 can access the SR-IOV resources 124 at the PCIe switch box system 100. When virtual machines 114 are executed at the host device 106, each virtual machine 114 can access the SR-IOV resources 124 at the PCIe switch box system 100.

A management computer 140 is provided to enable an administrator to remotely configure the PCIe switch box system 100. For example, through the management computer 140, the administrator of the PCIe switch box system 100 can set the privileges, access levels, and quotas for each host device. The management computer 140 can review requests from the host devices, and determine whether to grant to deny the requests. For example, if a host device requests an amount of solid state storage that exceeds the quota for the host device, the management computer 140 can either partially grant the request by allocating an amount of solid state storage that equals the quota to the host device, or increasing the quote for the host device. If the host device requests access to a resource that is beyond its access level, the management computer 140 can deny the request.

The PCIe switch box system 100 allows the host devices to be set up in an efficient manner. For example, the host device 102 may need a large amount of solid state storage for a few days per month to process a large amount of transaction data, and needs a smaller amount of solid state storage for the remaining days of the month. In this case, it is not economical for the host device to be installed with the large amount of solid state storage since it is only used for a small percentage of time. The host device 102 can be installed with the smaller amount of solid state storage that is needed most of the time, and the host device 102 can request additional solid state storage from the PCIe switch box system 100 when needed. The PCIe switch box system 100 can include a large number of solid state storage devices that are shared among the multiple host devices (e.g., 102, 104, 106), such that the solid stage storage is more fully utilized.

For example, the host device 104 may need to access several powerful graphics processing units for a few hours a week in order to train a large scale artificial intelligence neural network. After the neural network has been trained, the host device 104 may only need a smaller number of graphics processing units to perform the other day-to-day graphical processing tasks. In this example, the host device 104 can request access to additional graphics processing units from the PCIe switch box system 100 when needed. The PCIe switch box system 100 can include a large number of expensive and powerful graphics processing units that are shared among the multiple host devices (e.g., 102, 104, 106) such that the graphics processing units are more fully utilized.

For example, the host device 106 can provide software as a service and execute several instances of virtual machines 114 to support many remote users. The number of virtual machines 114 can vary depending on the number of remote users and the software applications. Each virtual machine 114 can request access to resources such as redundant array of independent disk (RAID) devices, and the amount of resources can vary. In this example, the host device 106 itself does not need to include a large number of RAID devices. Rather, the virtual machines 114 can request additional resources, such RAID devices, from the PCIe switch box system 100 when needed. This allows the host device 106 to be set up at a lower cost while still able to support a large number of instances of virtual machines to service a large number of remote users.

The PCIe switch box system 100 allows companies to be more flexible in deploying their computing resources. For example, the PCIe switch box system 100 can be located in a server room, and the host devices 102, 104, and 106 can be located in various offices remote from the server room. The large number of solid state storage devices, graphics processing units, and RAID devices can generate a large amount of heat and require special cooling facilities that can be noisy. By locating the computing resources, such as solid state storage devices, graphics processing units, and RAID devices away from the host devices and manage them centrally at the server room, the company can manage the computing resources more efficiently.

The PCIe switch box system 100 can have excess capacity and provide redundancy to allow the host devices 102, 104, 106 to operate continuously with a low down time in case some of the sources fail. For example, when one of the SR-IOV capable devices 108 fail, the PCIe switch box system 100 can quickly switch to another SR-IOV capable device 108 and continue to service the hosts 102, 104, 106.

The PCIe switch box system 100 enables the company to more conveniently upgrade their systems. For example, in a conventional system in which the solid state storage devices are installed locally at each host device, when the solid state storage devices need to be upgraded to provided more storage capacity, the host device needs to be shut down, and the housing of the host device needs to be opened up to allow the storage device to be upgraded. This results in downtime and inconvenience for the user. When the PCIe switch box system 100 is used, the host devices can request as much additional storage capacity as needed. The PCIe switch box system 100 can be designed such that the SR-IOV capable devices are hot pluggable, such that individual SR-IOV capable devices can be installed or removed without shutting down the PCIe switch box system 100. The administrator can upgrade the storage devices at the PCIe switch box system 100 without interrupting the operations of the host devices 102, 104, 106.

In some implementations, the management computer 140 provides an application programming interface (API) (referred to as the "SR-IOV configuration API") that allows host devices to configure the parameters of the SR-IOV capable PCIe devices. The parameters that are configurable can be different for different types of devices. As an example, for an NVMe storage device, the SR-IOV configuration API can be used to set the namespace configurations, the number of partitions in the storage device, the size of each partition, or the namespace identifier of the partition. The SR-IOV configuration API can assign a particular namespace identifier to a particular virtual function, set a namespace identifier to a "shared" state to allow the namespace identifier to be shared with another host device, or set a namespace identifier to a "private" state so that the namespace identifier is not shared with another host device. For example, the SR-IOV configuration API can send instructions to the controller of the PCIe device to perform the configuration actions mentioned above. For example, the host device can, through the SR-IOV configuration API, cause the PCIe device controller to set the namespace to the "private" state during certain periods of time, and set the namespace to the "shared" state during other periods of time. This way, the host device or a virtual machine executing at the host device can have exclusive use of the namespace during some periods of time, and share the namespace with other host devices or virtual machines during other periods of time.

For example, the host device (e.g., 102, 104, or 106) can send requests to the SR-IOV configuration API for configuring the parameters of an SR-IOV capable NVMe device, and the management computer 140 can determine whether to grant the requests. If the request is granted, the virtual function of the NVMe device is assigned to the host device. A PCI device tree stores information about the PCI devices accessible to the host device. For example, the PCI device tree can also store information about the physical and virtual functions that are accessible to the host device. When a new virtual function is assigned to the host device, the new virtual function is added to the PCI device tree. When a virtual function is removed from the host device, the virtual function is also removed from the PCI device tree.

For example, in a conventional SR-IOV system, if a set of virtual functions is assigned to a host device, when the host device is turned off and on again, the SR-IOV drivers are not loaded automatically because the basic input/output system (BIOS) cannot see the virtual functions, and the host device no longer have access to the set of virtual functions. The host device need to follow a procedure to reload or reset the set of virtual functions.

By comparison, the PCIe switch box system 100 manages and stores the SR-IOV configuration parameters, so the SR-IOV functions are still available to the host device after the host device reboots. For example, suppose a set of physical and virtual functions are assigned to a host device, the virtual functions have particular namespace configurations, a storage device assigned to the host device has a particular number of partitions, each partition have a particular size, each partition has a particular namespace identifier, a particular namespace identifier is set to the "shared" state, etc., these configurations will still be available to the host device after the host device reboots. For example, the PCIe switch box system 100 can store information about the PCI device tree showing which physical and virtual functions can be accessed by the host device and provides the PCI device tree to the host device after the host device reboots.

In some implementations, the PCIe switch box system 100 enables hot-plug capability so that a hardware PCIe peripheral card (e.g., NVMe storage device card, or GPU card) can be plugged into a PCIe slot in the PCIe switch box system 100 without turning off the PCIe switch box system 100. When the peripheral card is plugged into the PCIe slot, the peripheral device is assigned to the PCIe space. If the peripheral card is removed from the PCIe slot, the peripheral device is un-assigned from the PCIe space.

In some implementations, when the administrator assigns a virtual function to a host device, if the host device has the hot-plug function, the host device will see the virtual function. If the host device does not have the hot-plug function, the host device can reboot and then the host device will see the virtual function.

The PCIe switch box system 100 performs a centralized management of the PCIe resources that can be virtualized and assigned to the host devices. The host devices can access management functions of the PCIe switch box system 100 through the SR-IOV configuration API. The specific management functions that can be accessed by a particular host device depends on the access level of the host device. For example, if the PCIe switch box system 100 includes SR-IOV capable GPU devices and the GPU functions are virtualized, it is possible to configure the host device access level such that the host device can see the GPU device on the PCI device tree during certain time periods, and the GPU device does not appear on the PCI device tree at other time periods.

For example, if the PCIe switch box system 100 includes SR-IOV capable NVMe storage devices and the NVMe storage functions are virtualized, it is possible to configure the host device access level such that the host device can see the NVMe device on the PCI device tree during certain time periods, and the NVMe device does not appear on the PCI device tree at other time periods.

In some implementations, the PCIe switch box system 100 can aggregate the physical and virtual functions of the SR-IOV capable PCIe devices so that a host device can access all, or a subset, of the physical and virtual functions of the PCIe devices. For example, if the PCIe switch box system 100 has 16 NVMe devices installed, and each NVMe device supports 4 virtual functions, then the PCIe switch box system 100 can support 64 virtual functions. These 64 virtual functions can be pooled together so that a single host can see all 64 virtual functions, or a subset of the 64 virtual functions depending on the access level of the host device. The PCIe switch box system 100 can provide virtualized NVMe solid state drives, virtualized GPU devices, virtualized RAID devices, and/or virtualized network interface cards.

Figure 2:
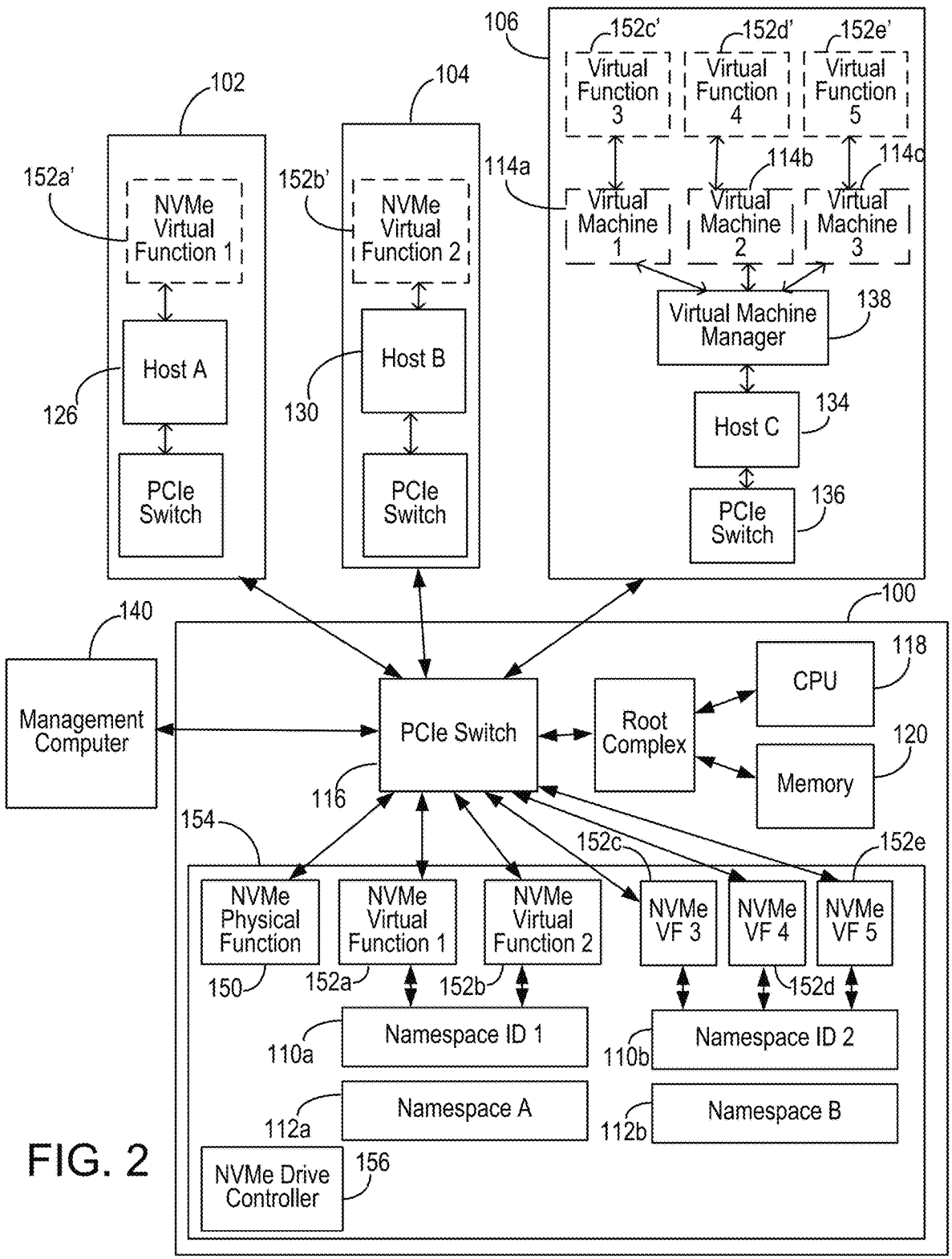

Referring to FIG. 2, the host devices can access the physical and virtual functions of an SR-IOV capable NVMe device located in the PCIe switch box system 100. The figure shows an example in which the SR-IOV capable PCIe device is an NVMe solid state drive 154. The NVMe solid state drive 154 provides an NVMe physical function 150, a first NVMe virtual function 152*a*, a second NVMe virtual function 152*b*, and an M-th NVMe virtual function 152*c*, and so forth. The NVMe solid state drive 154 includes an NVMe drive controller 156. The PCIe switch 116 assigns a first downstream NVMe virtual function 152*a* to an upstream host A 126, which allows the upstream host A 126 to access the first virtual function 152*a*. The host device 102 includes a first virtual function 152*a*' shown in dashed lines, indicating that the host A 126 can access the first virtual function 152*a* as if the first virtual function 152*a* is provided locally at the host device 102. The PCIe switch 116 assigns a first namespace identifier 110*a* to the first NVMe virtual function 152*a* and allows the first NVMe virtual function 152*a* to access a first namespace A 112*a*.

The PCIe switch 116 assigns a second downstream NVMe virtual function 152*b* to an upstream host B 130, which allows the upstream host B 130 to access the second virtual function 152*b*. The host device 104 includes a second virtual function 152*b*' shown in dashed lines, indicating that the host B 130 can access the second virtual function 152*b* as if the second virtual function 152*b* is provided locally at the host device 104. The NVMe drive controller 156 assigns the first namespace identifier 110*a* to the second NVMe virtual function 152*b* and allows the second NVMe virtual function 152*b* to access the first namespace A 112*a*. This way, both the host A 126 and the host B 130 can access the same namespace A 112*a*.

The host device 106 executes three virtual machines 114*a*, 114*b*, 114*c*. The PCIe switch 116 assigns a third downstream NVMe virtual function 152*c* to the upstream virtual machine 114*a*, which allows the upstream virtual machine 114*a* to access the third NVMe virtual function 152*c*. The host device 106 includes a third NVMe virtual function 152*c*' shown in dashed lines, indicating that the virtual machine 114*a* can access the third virtual function 152*c* as if the third virtual function 152c is provided locally at the host device 106. In a similar manner, the PCIe switch 116 assigns fourth and fifth downstream NVMe virtual functions 152d and 152e to the upstream virtual machines 114b and 114c, which allows the upstream virtual machines 114b and 114c to access the fourth and fifth NVMe virtual functions 152d and 152e, respectively. The host device 106 includes fourth and fifth NVMe virtual functions 152d' and 152e' shown in dashed lines, indicating that the virtual machines 114b and 114c can access the fourth and fifth virtual functions 152d and 152e as if the fourth and fifth virtual functions 152d and 152e are provided locally at the host device 106. The NVMe drive controller 156 assigns the second namespace identifier 110b to the third, fourth, and fifth NVMe virtual functions 152c, 152d, 152e and allows the virtual machines 114a, 114b, 114c to access the second namespace B 112b through the virtual functions 152c, 152d, and 152e.

The above is merely an example, the NVMe drive controller 156 can assign the namespaces to the virtual functions differently. For example, the NVMe drive controller 156 can assign the first namespace identifier 110a to the third NVMe virtual function 152c and allow the virtual machine 114a to access, through the third NVMe virtual function 152c, the namespace A 112a.

The management computer 140 can determine how the PCIe switch 116 assigns the NVMe virtual functions to the host devices and virtual machines, and how the namespace identifiers are assigned to the NVMe virtual functions. For example, some namespaces can corresponding to storage devices having higher throughput and greater security, and are reserved to host devices having higher privileges. Some host devices can belong to the same work group and can share access to the same files stored in a common namespace, so the NVMe drive controller 156 can attach the same namespace identifier to the virtual functions assigned to those host devices. If two different host devices do not share access to the same files, then the NVMe drive controller 156 assigns different namespaces to the virtual functions assigned to host devices and ensures that the files of each host device cannot be accessed by the other host device. A first virtual function assigned to a first host is hooked to a first synthetic PCIe tree that can be seen by the first host and allows the first host to access a first namespace attached to the first virtual function. A second virtual function assigned to a second host is hooked to a second synthetic PCIe tree that can be seen by the second host and allows the second host to access a second namespace attached to the second virtual function. The second virtual function is not hooked to the first synthetic PCIe tree, so the first host cannot identify the second virtual function and cannot access the second namespace. Likewise, the first virtual function is not hooked to the second synthetic PCIe tree, so the second host cannot identify the first virtual function and cannot access the first namespace.

Figure 3:
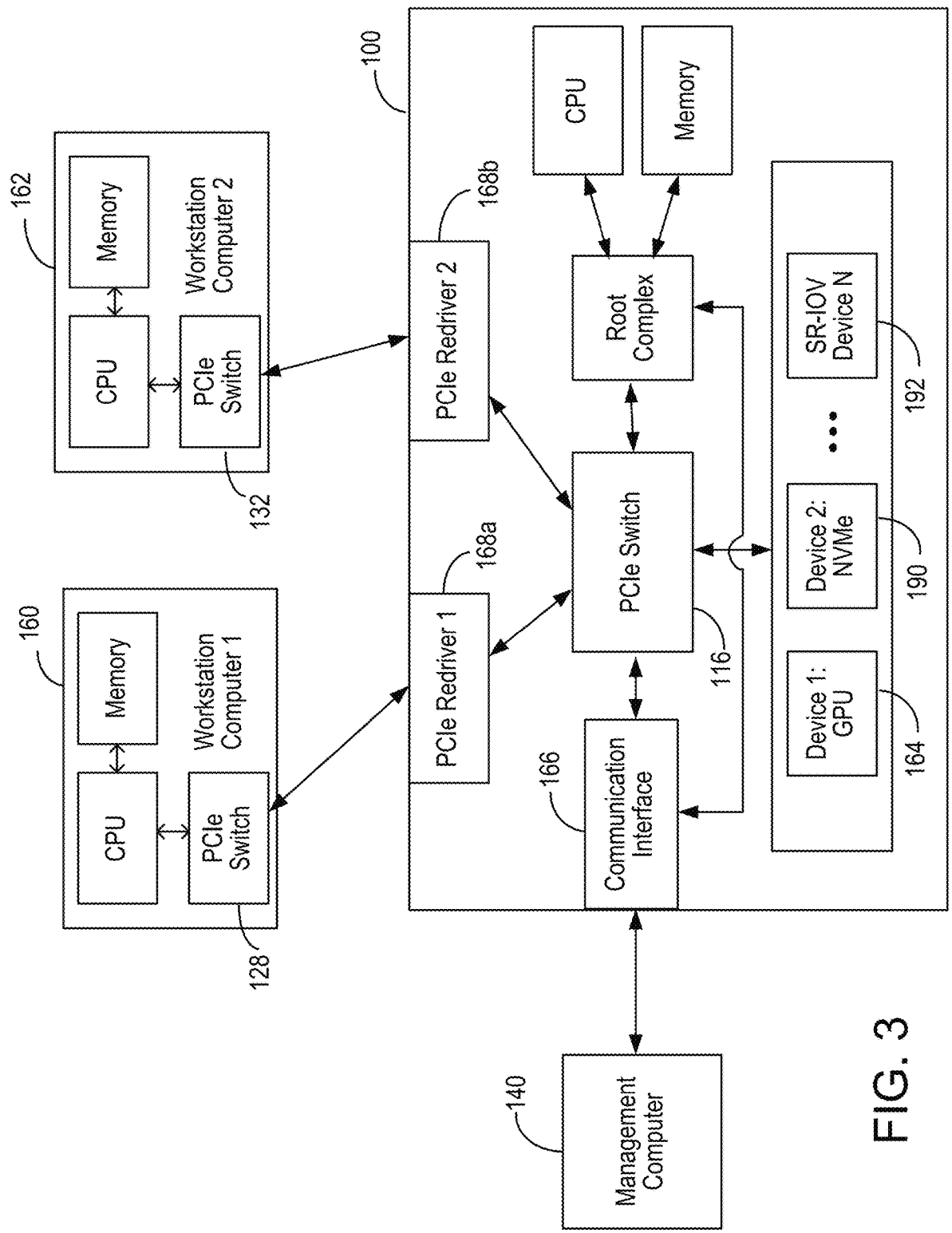

FIG. 3 is a diagram of an example in which workstation computers 160 and 162 access one or more of SR-IOV capable devices, such as a GPU 164, an NVMe device 190, and another SR-IOV capable device 192 through the PCIe switch box system 100. In some implementations, the PCIe switch box system 100 includes a communication interface 166 that allows the PCIe switch box system 100 to communicate with the management computer 140. For example, the management computer 140 can, through the communication interface 166, issue instructions to the management software executing in the PCIe switch box system 100. The PCIe switch box system 100 includes a first PCIe redriver 168a that functions as an interface between the PCIe switch 116 and the PCIe switch 128 of the first workstation computer 160. A second PCIe redriver 168b is provided as an interface between the PCIe switch 116 and the PCIe switch 132 of the second workstation computer 162. For example, the first and second PCIe redrivers 168a, 168b (also referred to as repeater integrated circuit) can condition the signals transmitted between the switch box PCIe switch 116 and the host PCIe switches 128, 132, respectively, such as boosting some frequency portions of the signals to counteract the frequency-dependent attenuations caused by the interconnections. The redrivers can condition transmitted signals through the physical layer and reduce jitter in the signals. Use of the redrivers can improve the quality of the signals transmitted between the switch box PCIe switch 116 and the host PCIe switches 128, 132.

Figure 4:
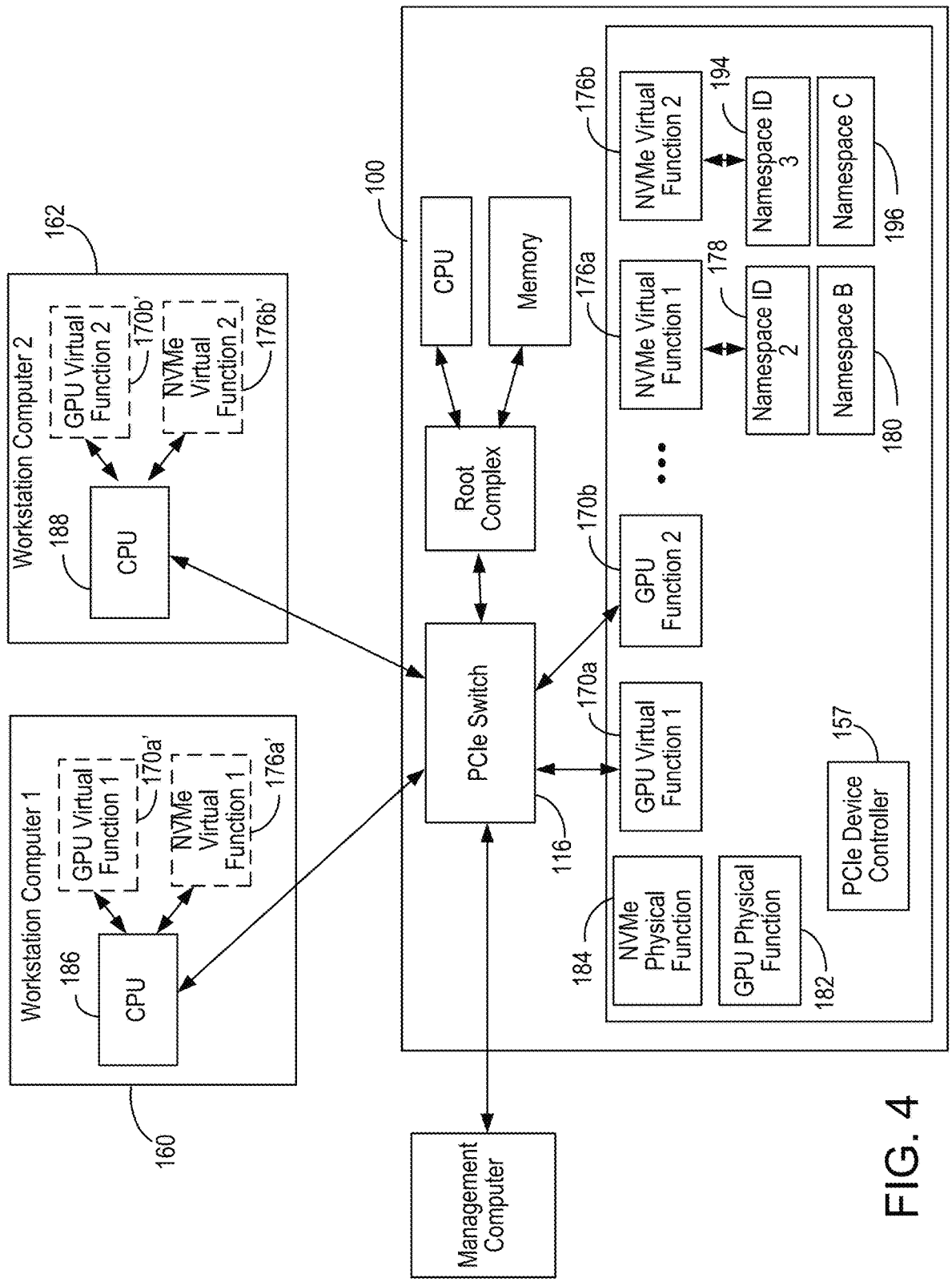

Referring to FIG. 4, in some implementations, the GPU device 164 (FIG. 3) provides a GPU physical function 182, a first GPU virtual function 170a, and a second GPU virtual function 170b. In this example, the switch box PCIe switch 116 assigns the first GPU virtual function 170a to the first workstation computer 160, and assigns the second GPU virtual function 170b to the second workstation computer 162. The first GPU virtual function 170a' and the second GPU virtual function 170b' shown in dashed lines in the first workstation computer 160 and the second workstation computer 162 indicate that the CPU 186 of the first workstation 160 can access the first GPU virtual function 170a as if it is provided locally, and the CPU 188 of the second workstation 162 can access the second GPU virtual function 170b as if it is provided locally.

In some implementations, the NVMe device 190 (FIG. 3) provides an NVMe physical function 184, a first NVMe virtual function 176a, and a second NVMe virtual function 176b. The switch box PCIe switch 116 assigns the first NVMe virtual function 176a to the first workstation computer 160, and assigns the second NVMe virtual function 176b to the second workstation computer 162. The first NVMe virtual function 170a' and the second NVMe virtual function 176b' shown in dashed lines in the first workstation computer 160 and the second workstation computer 162 indicate that the CPU 186 of the first workstation 160 can access the first NVMe virtual function 176a as if it is provided locally, and the CPU 188 of the second workstation 162 can access the second NVMe virtual function 176b as if it is provided locally.

A PCIe device controller 157 assigns a second namespace identifier 178 to the first NVMe virtual function 176a. This allows the CPU 186 of the first workstation computer 160 to access the namespace B 180 associated with the first NVMe virtual function 176a. The PCIe device controller 157 assigns a third namespace identifier 194 to the second NVMe virtual function 176b. This allows the CPU 188 of the second workstation computer 162 to access the namespace C 196 associated with the second NVMe virtual function 176b.

In the example of FIG. 4, the workstation computers 160 and 162 can use the GPU virtual functions 170 and access the namespaces of the NVMe device 190. The PCIe switch box system 100 can be configured to perform other assignments of the virtual functions to the workstation computers, and assignments of the namespace identifiers to the virtual functions, depending on the requirements of the host devices and the available SR-IOV capable resources. For example, the namespace B 180 and the namespace C 196 can be the same namespace, and the namespace ID2 and the namespace ID3 can be the same identifier. The namespace B 180/ namespace C 196 is shared by the first and second workstation computers 160, 162 allowing the first GPU virtual function 170a' executing on the first workstation computer 160 and the second GPU virtual function 170b' executing on the second workstation computer 162 to access the shared namespace. The first GPU virtual function 170a' can write data directly to the shared namespace, and the second GPU virtual function 170b' can read the data directly from the shared namespace. See FIG. 6 for additional information regarding access to a shared namespace by two host devices.

Figure 5:
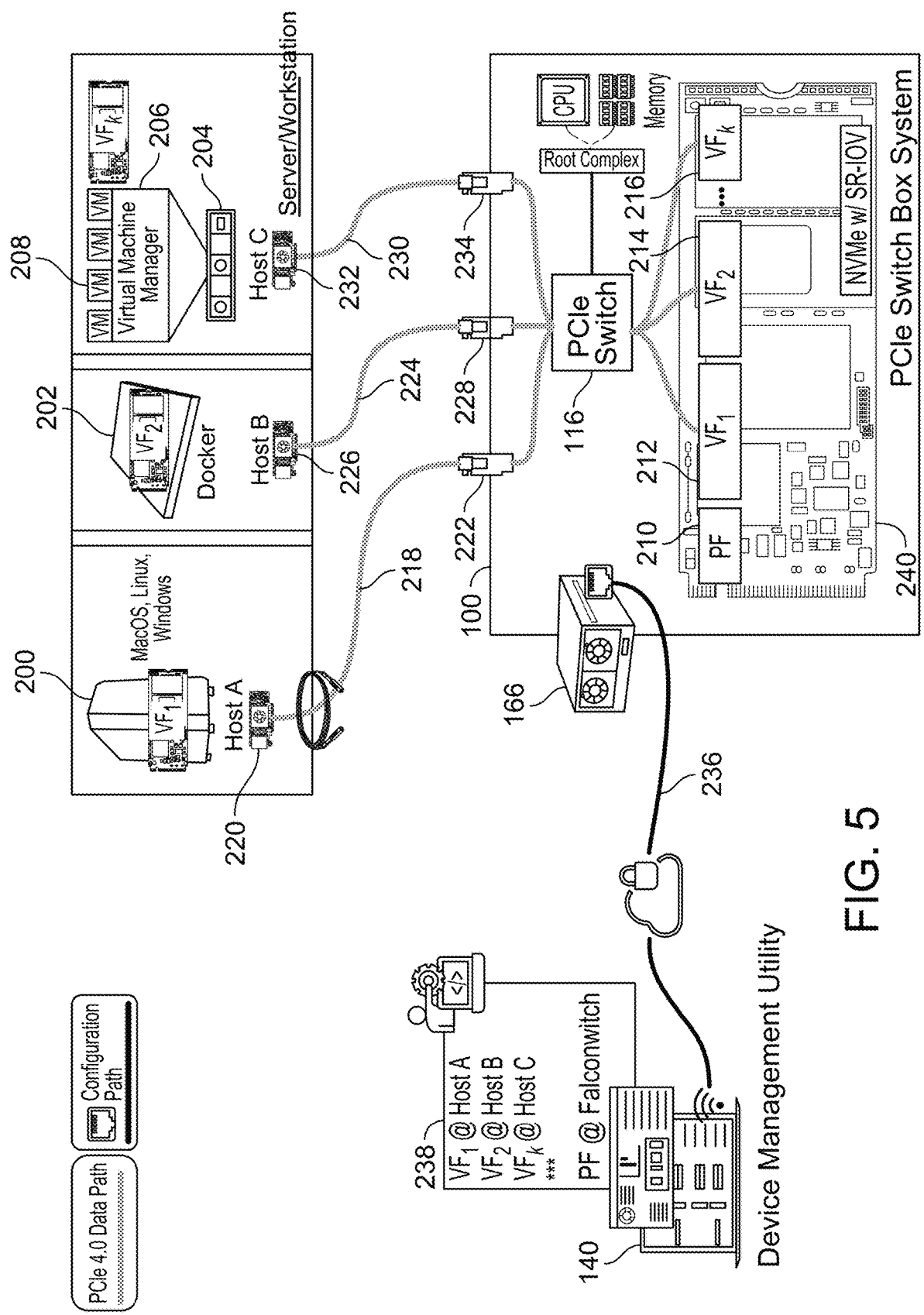

FIG. 5 is a diagram showing the signal paths between host devices (e.g., 200, 202, and 204), the management computer 140, and an SR-IOV capable NVMe device 240 in the PCIe switch box system 100. In this example, the host device 200 can be a personal computer executing MacOS, Linux, or Windows operating system. The host device 202 can be a server computer that executes Docker software. The host device 204 can include a virtual machine manager 206 and execute multiple virtual machines 208. The SR-IOV capable resource can be an NVMe solid state storage device that provides a physical function 210, a first virtual function 212, a second virtual function 214, and a k-th virtual function 216.

The switch manager 116 assigns the first virtual function 212 to the first host device 200, assigns the second virtual function 214 to the second host device 202, and assigns the k-th virtual function 216 to the virtual machines 208. The host device 200 accesses (e.g., read/write) the first virtual function 212 through a first PCIe data path 218. For example, the PCIe data path 218 can comply with PCIe 4.0 specification. The PCIe data path 218 extends from the PCIe switch 220 of the host device 200 to the PCIe redriver 222 of the PCIe switch box system 100, from the PCIe redriver 222 to the PCIe switch 116, and from the PCIe switch 116 to the first virtual function 212. The host device 202 accesses (e.g., read/write) the second virtual function 214 through a second PCIe data path 224, which can comply with, e.g., PCIe 4.0 specification. The PCIe data path 224 extends from the PCIe switch 226 of the host device 202 through the PCIe redriver 228 of the PCIe switch box system 100 and the PCIe switch 116 to the second virtual function 214. The virtual machines 208 of the host device 204 access (e.g., read/write) the k-th virtual function 216 through a third PCIe data path 230, which can comply with, e.g., PCIe 4.0 specification. The PCIe data path 230 extends from the PCIe switch 232 of the host device 204 through the PCIe redriver 234 of the PCIe switch box system 100 and the PCIe switch 116 to the k-th virtual function 216.

The management computer 140 communicates with the communication interface 166 of the PCIe switch box system 100 through a secure communication channel 236, such as a secure Ethernet link. The management computer 140 can provide a user interface 238 that allows the administrator to conveniently determine the capabilities of the PCIe switch box system 100, such as what SR-IOV capable devices are available, which physical and virtual functions are available, what namespace identifiers are available, and what namespaces are available. Through the user interface 238, the administrator can assign particular physical functions or virtual functions to particular host devices.

Figure 6:
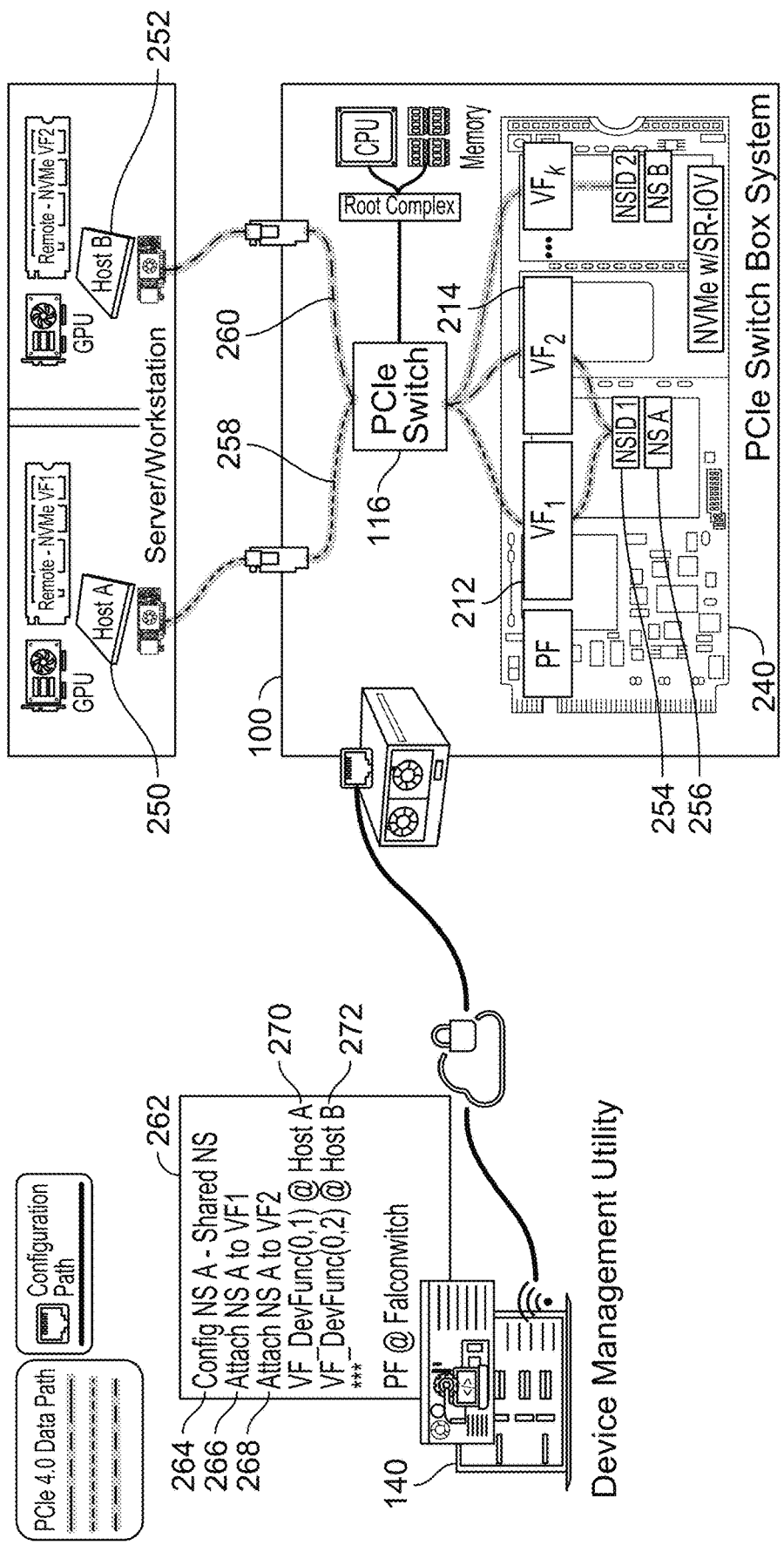

FIG. 6 is a diagram showing the signal paths between host devices 250 and 252, and namespaces that can be accessed by the host devices 250, 252. In this example, through the user interface 262 at the management computer 140, the administrator can configure namespace A 256 as a shared namespace (step 264), attach namespace A 256 to the first virtual function 212 (step 266), attach namespace A 256 to the second virtual function 214 (step 266), issue the instruction "VF_DevFunc(0,1)@Host A" (step 270), and issue the instruction "VF_DevFunc(0,2)@Host B" (step 272). In step 270, a resource mapping between NVMe virtual function to host device A is recorded, and in step 272, a resource mapping between NVMe virtual function to host device B is recorded.

As a result of the configuration instructions issued by the management computer 140, the first namespace identifier 254 is assigned to the first NVMe virtual function 212 and the second NVMe virtual function 214, which allows the first NVMe virtual function 212 and the second NVMe virtual function 214 to access the namespace 256. The host device 250 accesses the namespace 256 through the PCIe data path 258, and the host device 252 accesses the namespace 256 through the PCIe data path 260. For example, the PCIe data paths 258, 260 can comply with PCIe 4.0 specification.

Figure 7:
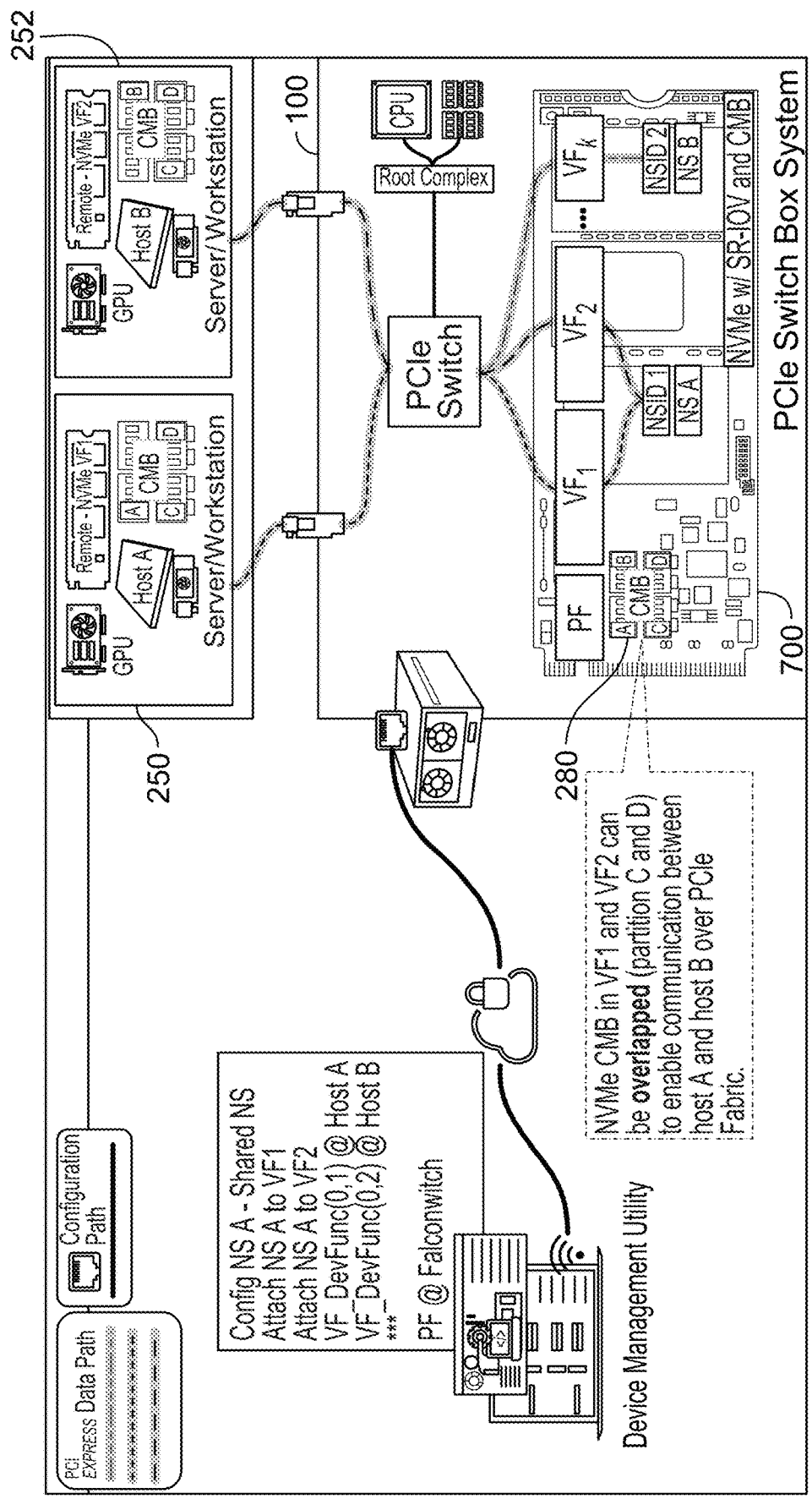

Referring to FIG. 7, an SR-IOV capable NVMe device 700 can have a controller memory buffer (CMB) 280 that can store queues and data for direct memory access (DMA). The queues and data for direct memory access can be stored in the host memory if the controller memory buffer 280 is not used. In this example, the controller memory buffer 280 includes partitions A, B, C, and D. In some examples, the NVMe controller memory buffer 280 is configured such that some partitions are configured to be shared by two or more virtual functions. For example, the NVMe controller memory buffer 280 can be configured to have partitions C and D shared by the first virtual function 212 and the second virtual function 214. The first virtual function 212 is assigned to a host A 250, and the second virtual function 214 is assigned to a host B 252. Because the partitions C and D of the controller memory buffer are shared by the first and second virtual functions 212, 214, the partitions C and D of the controller memory buffer can be accessed by both the host A 250 and the host B 252. This enables communication between host A 250 and host B 252 over the PCIe fabric through shared access to the partitions C and D of the controller memory buffer. For example, the host A 250 can write data to the partition(s) C and/or D of the controller memory buffer, and the host B 252 can read the data from the partition(s) C and/or D of the controller memory buffer. Similarly, the host B 252 can write data to the partition(s) C and/or D of the controller memory buffer, and the host B 252 can read the data from the partition(s) C and/or D of the controller memory buffer.

One of the features of the PCIe switch box system 100 is that the SR-IOV capable PCIe devices are configured such that the controller memory buffer of each SR-IOV capable PCIe device is exposed on the PCIe bus. This allows the controller memory buffer to be accessed (e.g., read/write) by other devices connected to the PCIe bus. The SR-IOV capable PCIe devices can include, e.g., redundant array of independent disk (RAID) devices, field programmable gate array (FPGA) devices, network interface cards, and graphics processing units. The controller memory buffer can be implemented using the memory devices on board the SR-IOV capable PCIe devices. When a first host device transmits data to a second host device, the transmission of data can be accomplished using the PCIe fabric without additional external peripheral interfaces.

In some implementations, the PCIe switch box system 100 is configured such that when the namespace of an NVMe device is set to a "shared" state, the PCIe switch box system 100 allows different host devices to use different virtual functions to access the same NVMe namespace. This design has the advantage that, because different host devices can access the same NVMe namespace, the transfer of data between different host devices can be made much faster. Another advantage is that because it is not necessary to separately install network interface cards for the purpose of transferring data between the host devices, the hardware and software costs associated with the network interface cards can be reduced or eliminated.

In some implementations, the PCIe switch box system 100 is configured such that when the controller memory buffer of an NVMe device is set to a "shared" state, the PCIe switch box system 100 allows different host devices to use different virtual functions to access the same NVMe controller memory buffer. This design has the advantage that, because different host devices can access the same NVMe controller memory buffer, the transfer of data between different host devices can be made much faster. For example, the operating system on each of the first and second host devices can manage access to the shared controller memory buffer to avoid conflicts.

Figure 24:
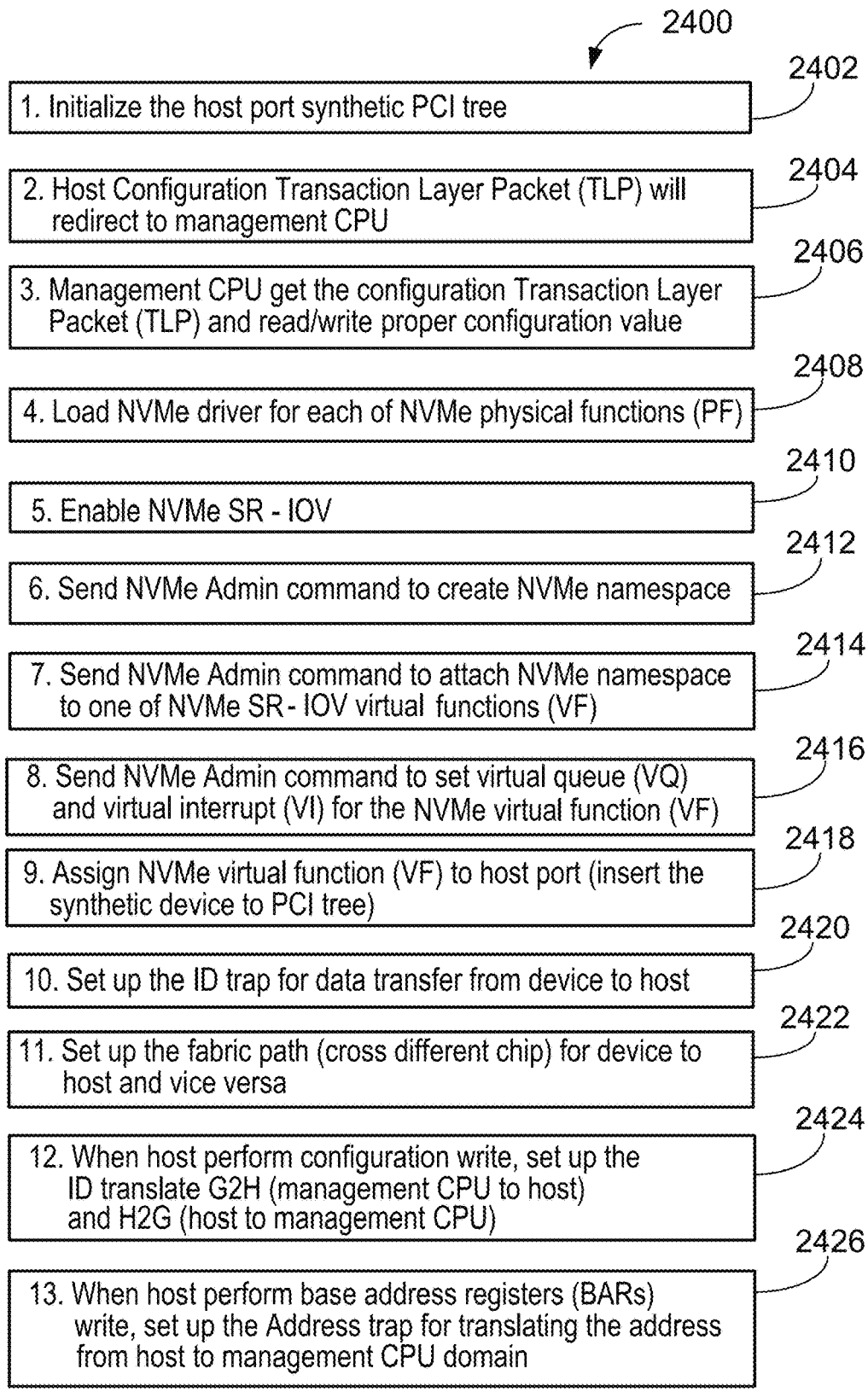
FIG. 24 is a diagram of an example of a process for assigning an NVMe SR-IOV virtual function of an SR-IOV capable PCIe device to a host port.
Figure 25:
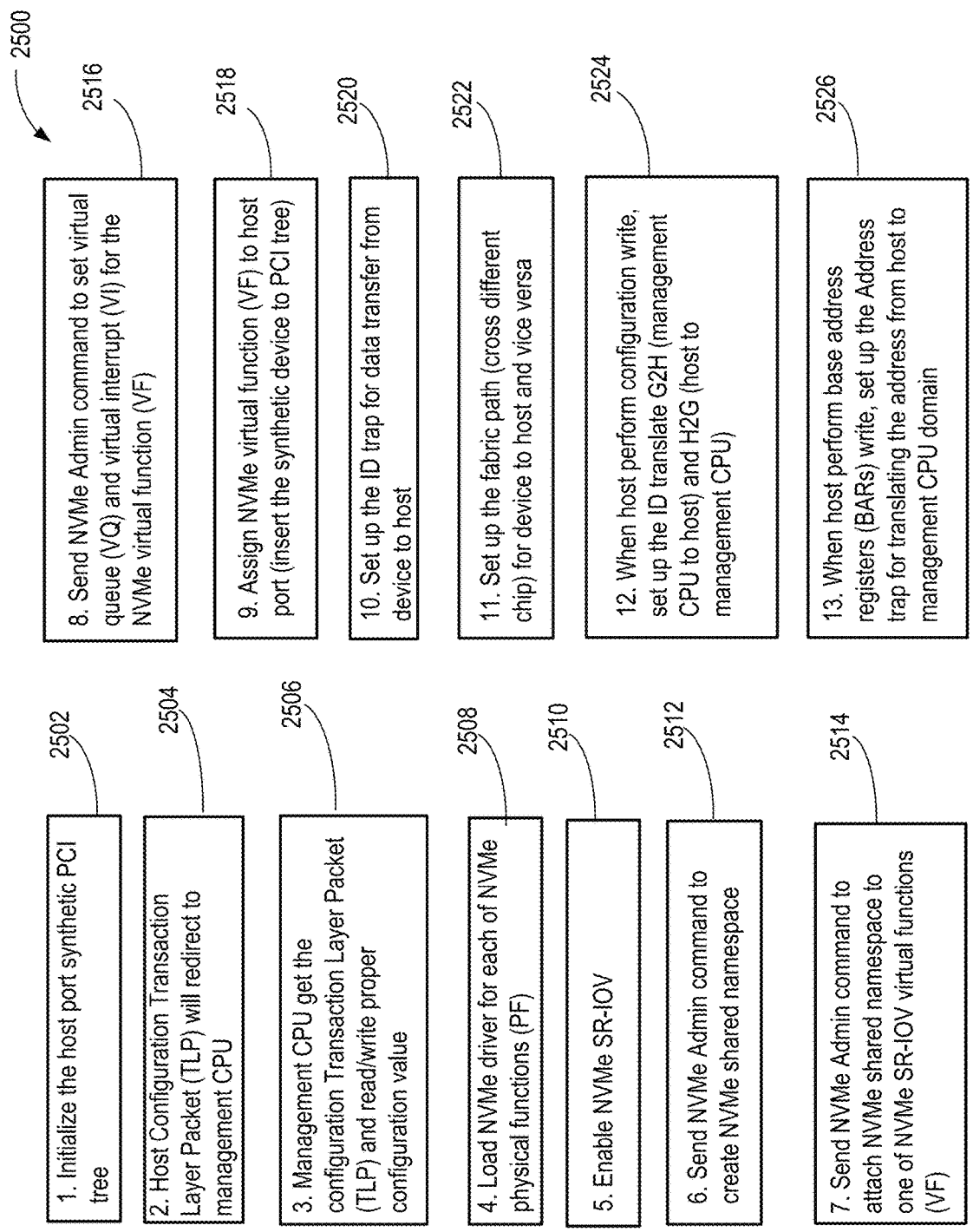
FIG. 25 is a diagram of an example of a process for assigning an NVMe SR-IOV virtual function with a shared NVMe namespace to a host port.
Figure 26:
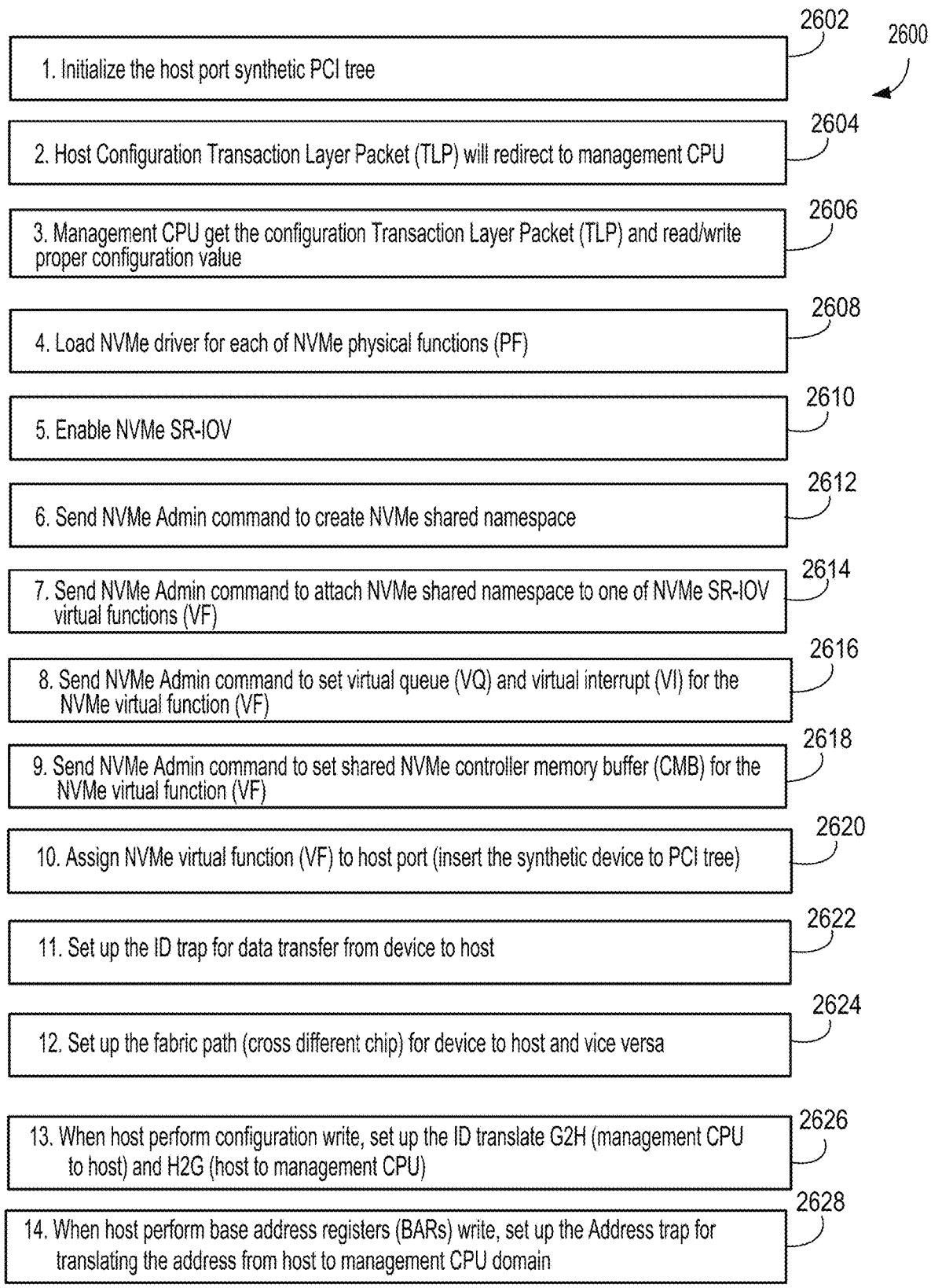
FIG. 26 is a diagram of an example of a process for assigning an NVMe SR-IOV virtual function with a shared NVMe controller memory buffer to a host port.

In some implementations, the CPU 118 configures the PCIe switch 116 to enable the host devices to transfer data using a shared namespace or a shared controller memory buffer through the PCIe fabric by using the processes shown in FIGS. 24 to 26.

FIG. 24 is a diagram of an example of a process 2400 for configuring the PCIe switch 116 to assign an NVMe SR-IOV virtual function of an SR-IOV capable PCIe device to a host port, which can be a port of a particular host device, e.g., 102, 104, 106 in FIG. 1. At step 2402, a host port synthetic PCI tree is initialized. At step 2404, the host device sends a PCIe configuration transaction layer packet (TLP) to inquire information about the PCIe devices that are available. The PCIe configuration transaction layer packet is redirected by the switch box PCIe switch 116 to the management CPU 118. At step 2406, the management CPU 118 modifies the PCIe configuration transaction layer packet in a way such that the packet received by the PCIe device is similar to the packet that the PCIe device would receive if the PCIe device were installed in the host device. Thus the PCIe device behaves in the same manner as if it were installed in the host device. At step 2408, the management CPU 118 loads the NVMe drivers for the NVMe physical functions (PF) to enable the management software in the PCIe switch box system 100 to perform setup of the NVMe drive, such as generating namespaces, attaching a namespace to an NVMe virtual function. At step 2410, the NVMe SR-IOV function is enabled.

At step 2412, the management CPU 118 sends an NVMe admin command to the NVMe drive controller 156 (FIG. 2) to generate an NVMe namespace. At step 2414, the management CPU 118 sends an NVMe admin command to the NVMe drive controller 156 to attach an NVMe namespace to one of NVMe SR-IOV virtual functions (VF). At step 2416, the management CPU 118 sends an NVMe admin command to the NVMe drive controller 156 to set a virtual queue (VQ) and a virtual interrupt (VI) for the NVMe virtual function (VF). The virtual queue resource (VQ resource) is a type of controller resource that manages one submission queue (SQ) and one completion queue (CQ). The virtual interrupt resource (VI resource) is a type of controller resource that manages one interrupt vector. The NVM subsystem includes primary controller(s) and secondary controller(s), in which the secondary controller(s) depend on the primary controller(s) for dynamically assigned resources. At step 2418, the management CPU 118 assigns an NVMe virtual function (VF) to the host port (e.g., insert a synthetic device to the PCI tree). At step 2420, the management CPU 118 sets up a PCI identity (ID) trap for data transfer from the NVMe device to the host port. The PCI identity trap is set up at a downstream port to provide identity (ID) routing information for upstream routes (IO device to the host device). For example, this can occur when the IO device initiates a DMA data transfer. The address routing will be transformed to ID routing, since the address value is in the host address space.

At step 2422, the management CPU 118 sets up the fabric path (across different chips) for sending data from the PCIe device to the host port, and from the host port to the PCIe device. For example, this provides routing information, when the destination is not in the source switch. Thus, the fabric path can be used in cross-switch or cross-domain environments, e.g., switch cascade. This supports up to 256 domains and up to 256 busses per domain.

At step 2424, when the host device writes configuration data, the PCI identifier (ID) translations for G2H (management CPU to host) and H2G (host to management CPU) are set up. For example, this translates the requester ID (RID) between host (local) domain and mCPU (global) domain. The TLP travels between the host domain and the mCPU domain, so the requester ID needs to be translated to a proper value. This provides local-to-global and global-to-local RID translation.

At step 2426, when the host device writes to the base address registers (BARs), an address trap for translating the address from the host device to the management CPU 118 domain is set up. For example, this translates addresses between the host device and the PCIe device. The setup at a host port (BAR access) is as follows: The host address space will be translated to mCPU address space within a specific range. The setup at a downstream (PCIe device) port is as follows: The first device address will be translated to another device address for peer-to-peer transfer.

FIG. 25 is a diagram of an example of a process 2500 for configuring the PCIe switch 116 to assign an NVMe SR-IOV virtual function with a shared NVMe namespace to the host port. Steps 2502 to 2510 are similar to the steps 2402 to 2410, respectively. Of FIG. 24. At step 2512, the management CPU 118 sends an NVMe admin command to the NVMe drive controller 156 (FIG. 2) to generate an NVMe shared namespace. The NVMe device is designed such that a namespace can be set to a "private" state or a "shared" state. If the namespace is set to the "private" state, the namespace can only be attached to a single virtual function and be accessed by that single virtual function. When the single virtual function is assigned to a particular host device, the private namespace can only be accessed by the particular host device through the virtual function. If the namespace is set to the "shared" state, the namespace can be attached to multiple virtual functions and be accessed by those multiple virtual functions. When the virtual functions are assigned to host devices, the shared namespace can be accessed by the corresponding host devices through the virtual functions. At step 2514, the management CPU 118 sends an NVMe admin command to the NVMe drive controller 156 to attach an NVMe shared namespace to one of NVMe SR-IOV virtual functions (VF). Steps 2516 to 2526 are similar to the steps 2416 to 2426, respectively.

FIG. 26 is a diagram of an example of a process 2600 for configuring the PCIe switch 116 to assign an NVMe SR-IOV virtual function with a shared namespace and a shared NVMe controller memory buffer to a host port. Steps 2602 to 2616 are similar to steps 2502 to 2516, respectively, of FIG. 25. At step 2618, the management CPU 118 sends an NVMe admin command to the NVMe drive controller 156 to set an NVMe controller memory buffer (CMB) to a "shared" state, and attach the shared controller memory buffer to one of the NVMe virtual functions (VF). In some examples, the controller memory buffer can have multiple partitions. One or more of the partitions can be set to the "shared" state, while other partitions are set to the "private" state. The NVMe device is designed such that the controller memory buffer, or a partition in the controller memory buffer, can be set to a "private" state or a "shared" state. If a partition in the controller memory buffer is set to the "private" state, the CMB partition can only be attached to a single virtual function and be accessed by that single virtual function. When the single virtual function is assigned to a particular host device, the private CMB partition can only be accessed by the particular host device through the virtual function. If the CMB partition is set to the "shared" state, the CMB partition can be attached to multiple virtual functions and be accessed by those multiple virtual functions. When the virtual functions are assigned to host devices, the shared CMB partition can be accessed by the corresponding host devices through the virtual functions. Steps 2620 to 2628 are similar to steps 2518 to 2526, respectively, of FIG. 5.

Figure 27:
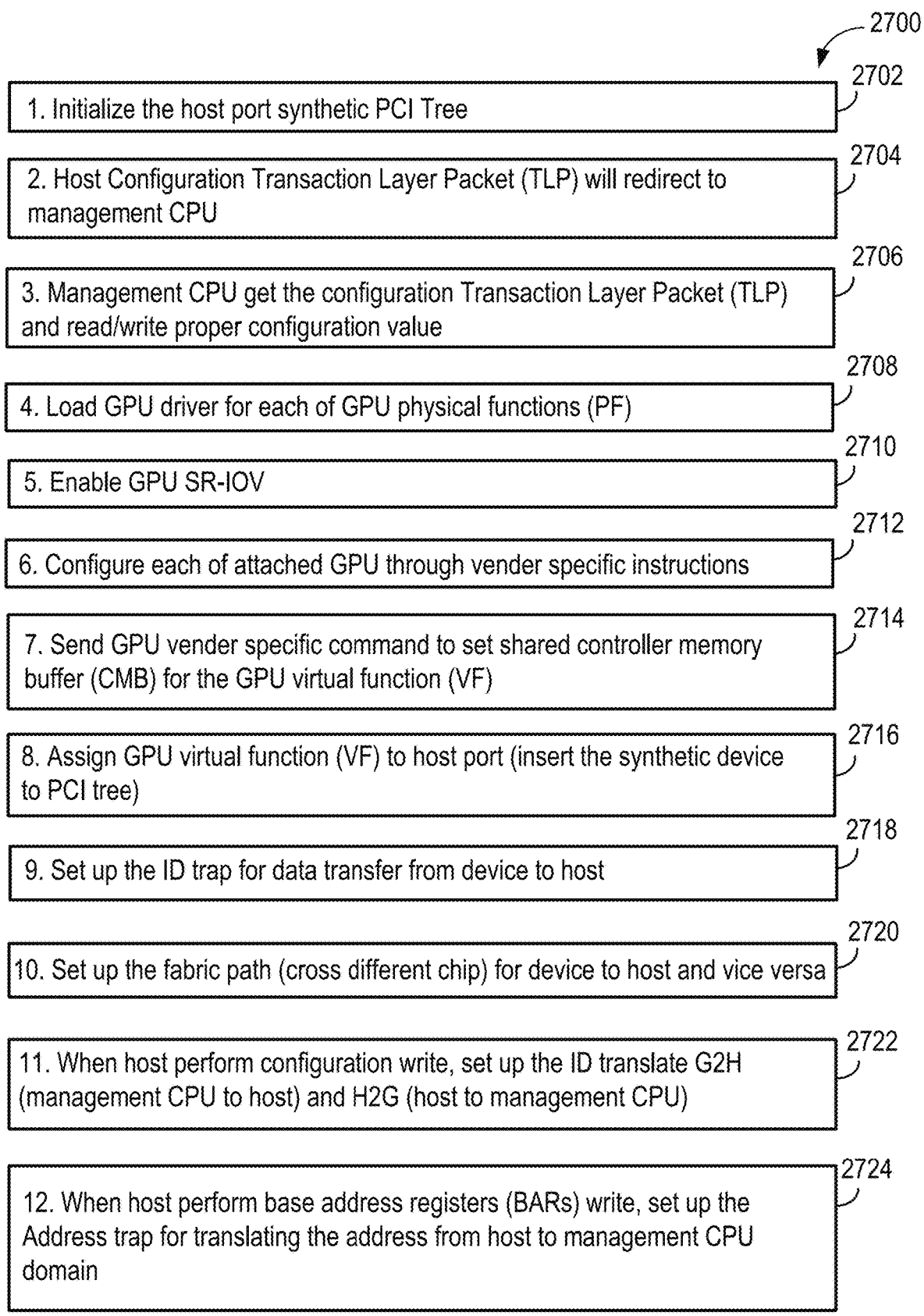
FIG. 27 is a diagram of an example of a process for configuring the PCIe switch to assign a GPU SR-IOV virtual function with shared GPU controller memory buffer to a host port.

Similar principles can be applied to enable the host devices to access a shared GPU controller memory buffer. FIG. 27 is a diagram of an example of a process 2700 for configuring the PCIe switch 116 to assign a GPU SR-IOV virtual function with shared GPU controller memory buffer to a host port. Steps 2702 to 2706 are similar to steps 2602 to 2606, respectively, of FIG. 26. At step 2708, the management CPU 118 loads the GPU driver for each GPU physical function (PF)) to enable the management software in the PCIe switch box system 100 to perform setup of the GPU. At step 2710, the GPU SR-IOV function is enabled. At step 2712, the management software configures each of the attached GPU through vendor specific instructions.

At step 2714, the management CPU 118 sends a GPU vendor specific command to the GPU controller to set a GPU controller memory buffer (CMB) to a "shared" state, and attach the shared controller memory buffer to one of the GPU virtual functions (VF). In some examples, the controller memory buffer can have multiple partitions. One or more of the partitions can be set to the "shared" state, while other partitions are set to the "private" state. The GPU is designed such that the controller memory buffer, or a partition in the controller memory buffer, can be set to a "private" state or a "shared" state. If a partition in the controller memory buffer is set to the "private" state, the CMB partition can only be attached to a single virtual function and be accessed by that single virtual function. When the single virtual function is assigned to a particular host device, the private CMB partition can only be accessed by the particular host device through the virtual function. If the CMB partition is set to the "shared" state, the CMB partition can be attached to multiple virtual functions and be accessed by those multiple virtual functions. When the virtual functions are assigned to host devices, the shared CMB partition can be accessed by the corresponding host devices through the virtual functions.

At step 2716, the management CPU 118 assigns a GPU virtual function (VF) to the host port (e.g., insert a synthetic device to the PCI tree). At step 2718, the management CPU 118 sets up a PCI identity (ID) trap for data transfer from the GPU to the host port. The PCI identity trap is set up at a downstream port to provide identity (ID) routing information for upstream routes (IO device to the host device). For example, this can occur when the IO device initiates a DMA data transfer. The address routing will be transformed to ID routing, since the address value is in the host address space. Steps 2720 to 2724 are similar to steps 2624 to 2628, respectively, of FIG. 6.

Thus, the PCIe switch box system 100 allows the host devices to transfer data using a shared namespace or a shared controller memory buffer of an NVMe device or a GPU through the PCIe fabric. This significantly increases the speed of data transfer between host devices.

Figure 8:
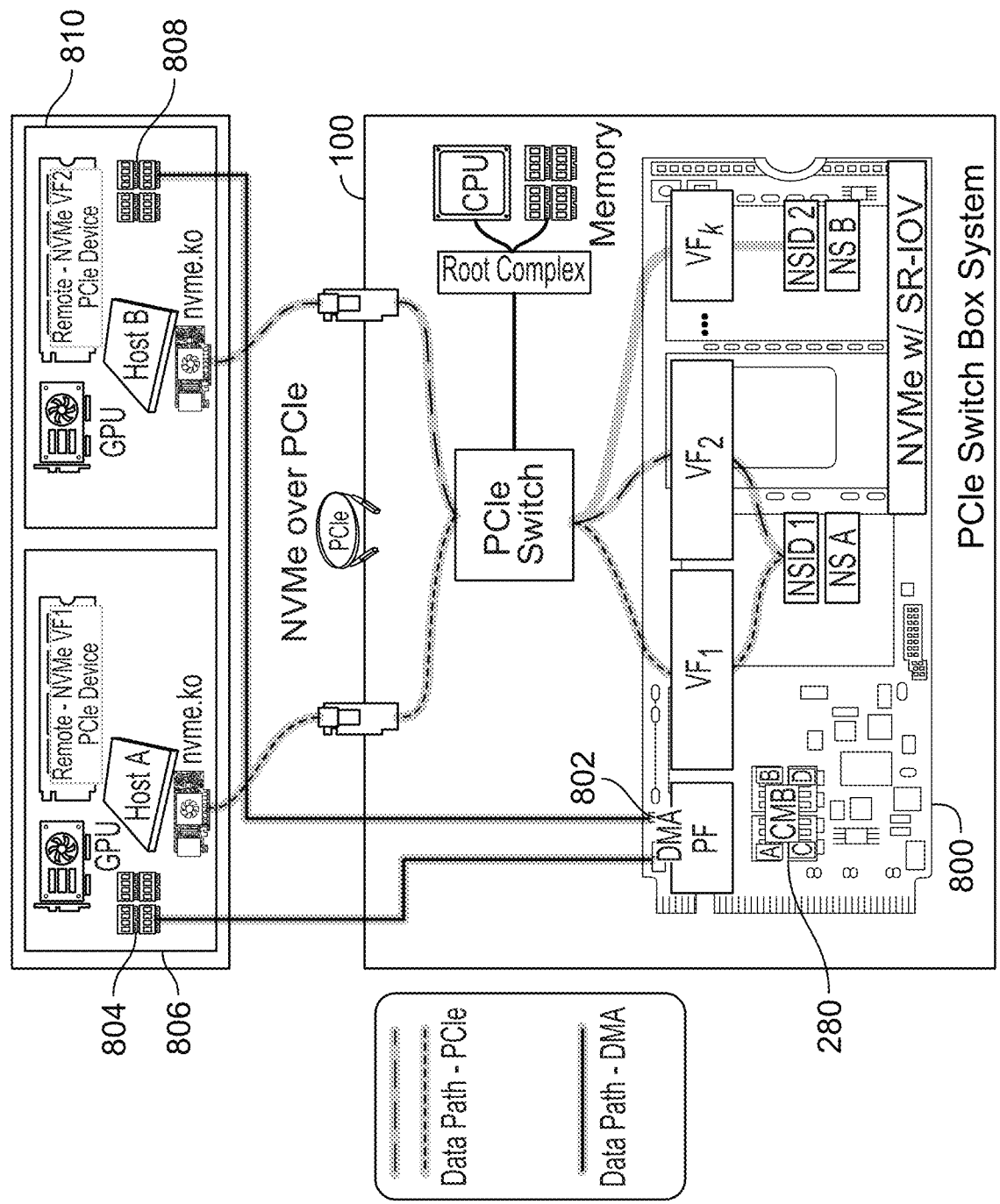

Referring to FIG. 8, the switch box 100 allows direct memory access (DMA) data transfers from a first host device to a second host device to be performed faster as compared to a conventional SR-IOV system that uses remote DMA (RDMA) through an Ethernet interface card. In some implementations, an NVMe device 800 includes a DMA engine 802 that can read data from the NVMe controller memory buffer 280 and write the data to a main memory 804 of a host device A 806, or read data from the main memory 804 of the host device A 806 and write the data to the NVMe controller memory buffer 280. Similarly, the DMA engine 802 can read data from the NVMe controller memory buffer 280 and write the data to a main memory 808 of a host device B 810, or read data from the main memory 808 of the host device B 810 and write the data to the NVMe controller memory buffer 280. By using the process 2600 of FIG. 26, one or more partitions of the controller memory buffer 280 can be shared by host device A 806 and host device B 810. The DMA engine 802 of the NVMe device 800 can then be used to transfer data from the main memory 804 of the host device A 806 to the main memory 808 of the host device B 810 through the shared controller memory buffer 280. Similarly, the DMA engine 802 of the NVMe device 800 can be used to transfer data from the main memory 808 of the host device B 810 to the main memory 804 of the host device A 806 through the shared controller memory buffer 280.

Figure 9:
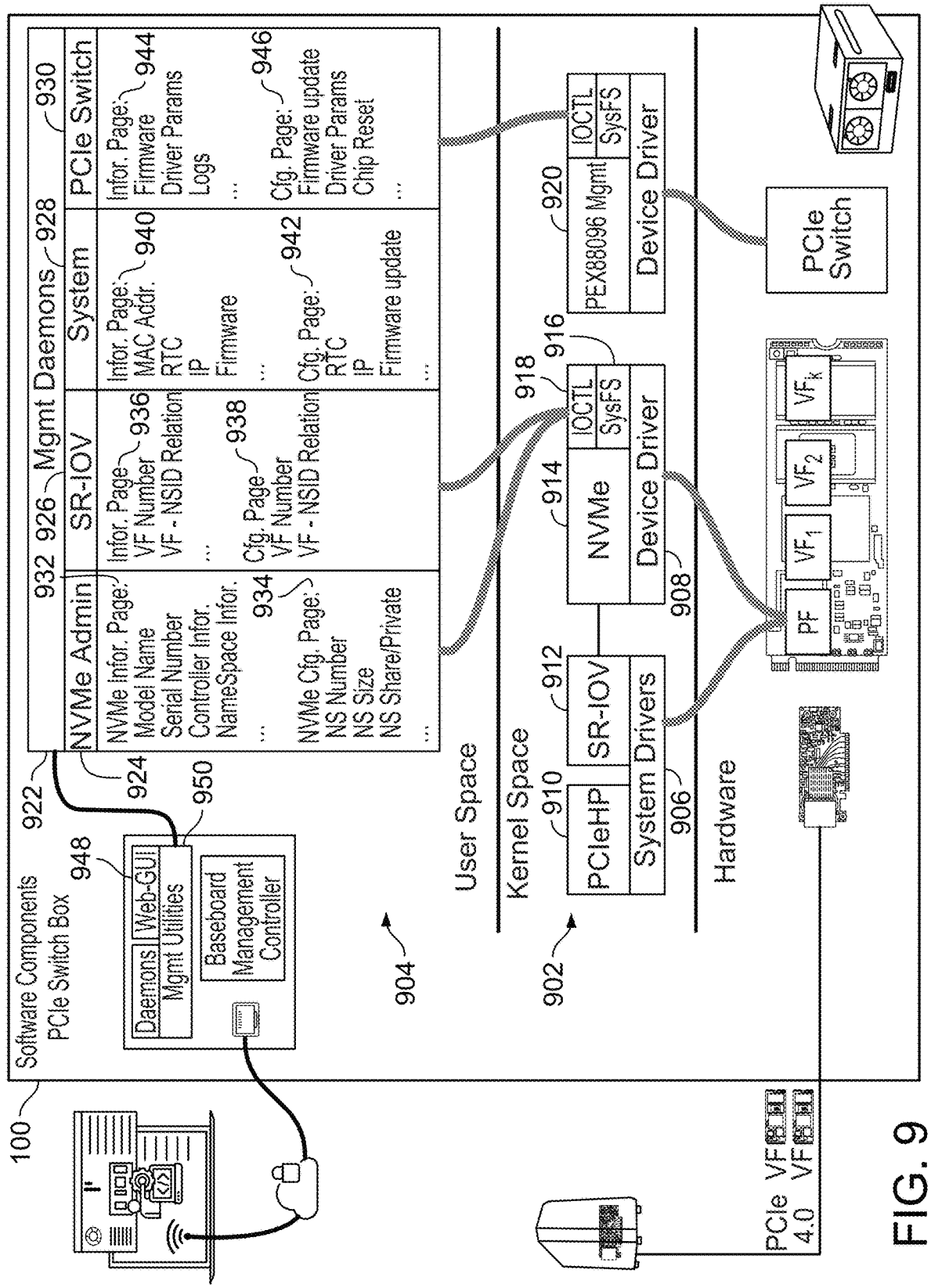
FIGS. 9 and 10 are diagrams of examples of the hardware and software components of the PCIe switch box system.

Referring to FIG. 9, the PCIe switch box system 100 includes hardware and software components. The software components can be divided into a kernel space 902 and a user space 904. The kernel space 902 can include, e.g., system drivers 906 and device drivers 908. The system drivers 906 can include, e.g., PCIeHP drivers 910 and SR-IOV drivers 912. The device drivers 908 can include, e.g., NVMe drivers 914 and PCIe switch management divers 920 (e.g., PEX88096 management drivers). For example, the NVMe drivers 914 can provide a SysFS interface 916 and an IOCTL interface 918. The applications in the user space 904 can issue operation commands to the NVMe drivers 912 using Sysfs and IOCTL function calls.

The user space 904 can include management utility applications 950 that include management daemons 922, e.g., an NVMe administrator daemon 924, an SR-IOV daemon 926, a system daemon 928, and a PCIe switch daemon 930. The NVMe administrator daemon 924 can manage and store information, e.g., an NVMe information page 932 and an NVMe configuration page 934. The NVMe information page 932 can include, e.g., model name, serial number, controller information, and namespace information. The NVMe configuration page 934 can include, e.g., namespace number, namespace size, and namespace share/private state information.

The SR-IOV daemon 926 can manage and store information, e.g., an information page 936 and a configuration page 938. The information page 936 can include, e.g., virtual function number, virtual function and namespace identifier relation information. The configuration page 938 can store, e.g., virtual function number, and virtual function and namespace identifier relation information. The system daemon 928 can manage and store information, e.g., an information page 940 and a configuration page 942. The information page 940 can include, e.g., MAC address, RTC, internet protocol (IP) address, firmware information. The configuration page 942 can store, e.g., RTC, IP, firmware update information. The PCIe switch daemon 930 can manage and store information, e.g., an information page 944 and a configuration page 946. The information page 944 can store, e.g., firmware information, driver parameters, and log files. The configuration page 946 can store, e.g., firmware update information, driver parameters, and chip reset information.

A web graphical user interface 948 can be provided to allow the user to easily configure various functions and parameters of the PCIe switch box system 100.

Figure 10:
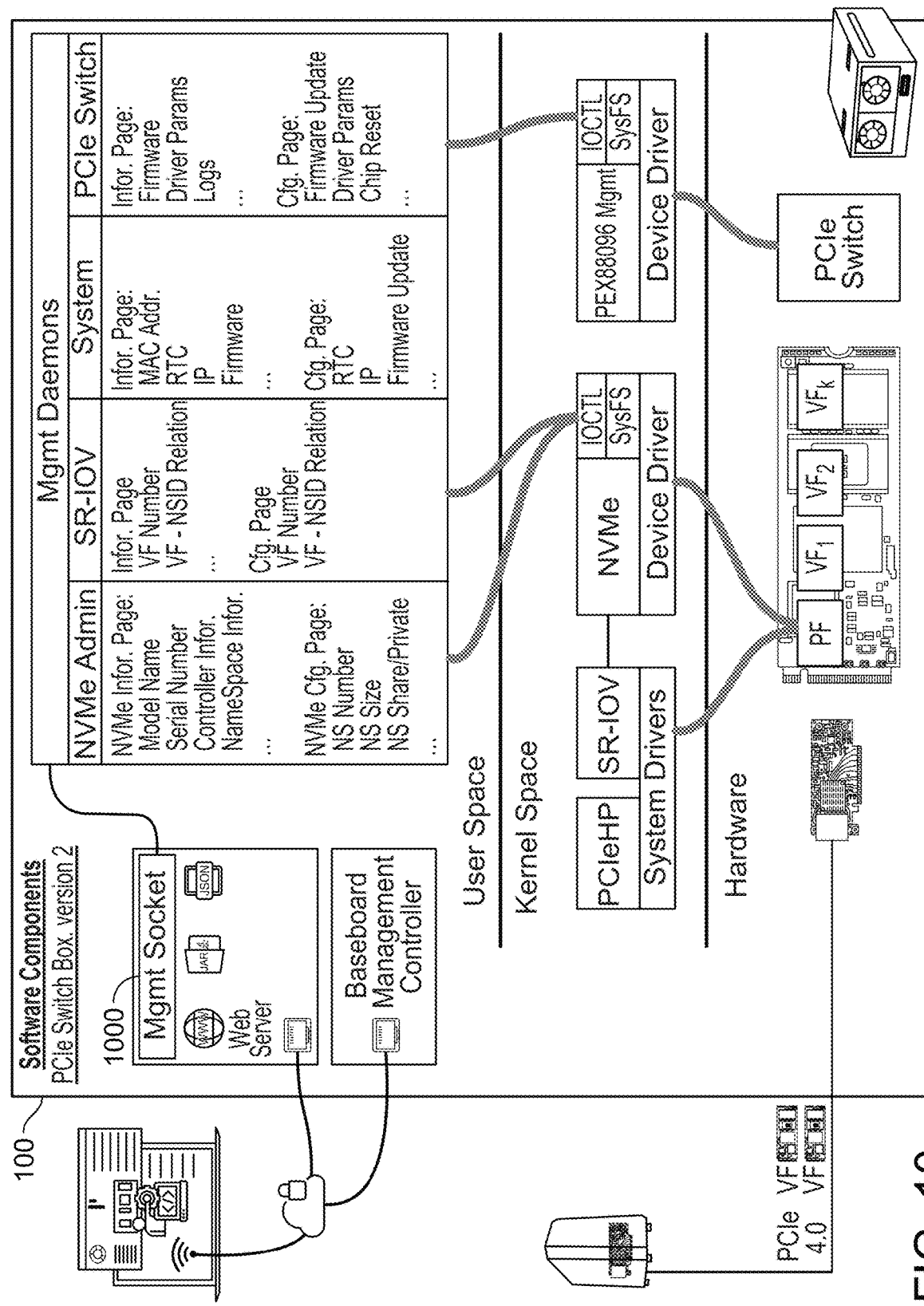

Referring to FIG. 10, in some implementations, the PCIe switch box system 100 includes software components that include a management socket 1000 that can support multiple functions, e.g., web server, JAR, JSON.

Figure 11:
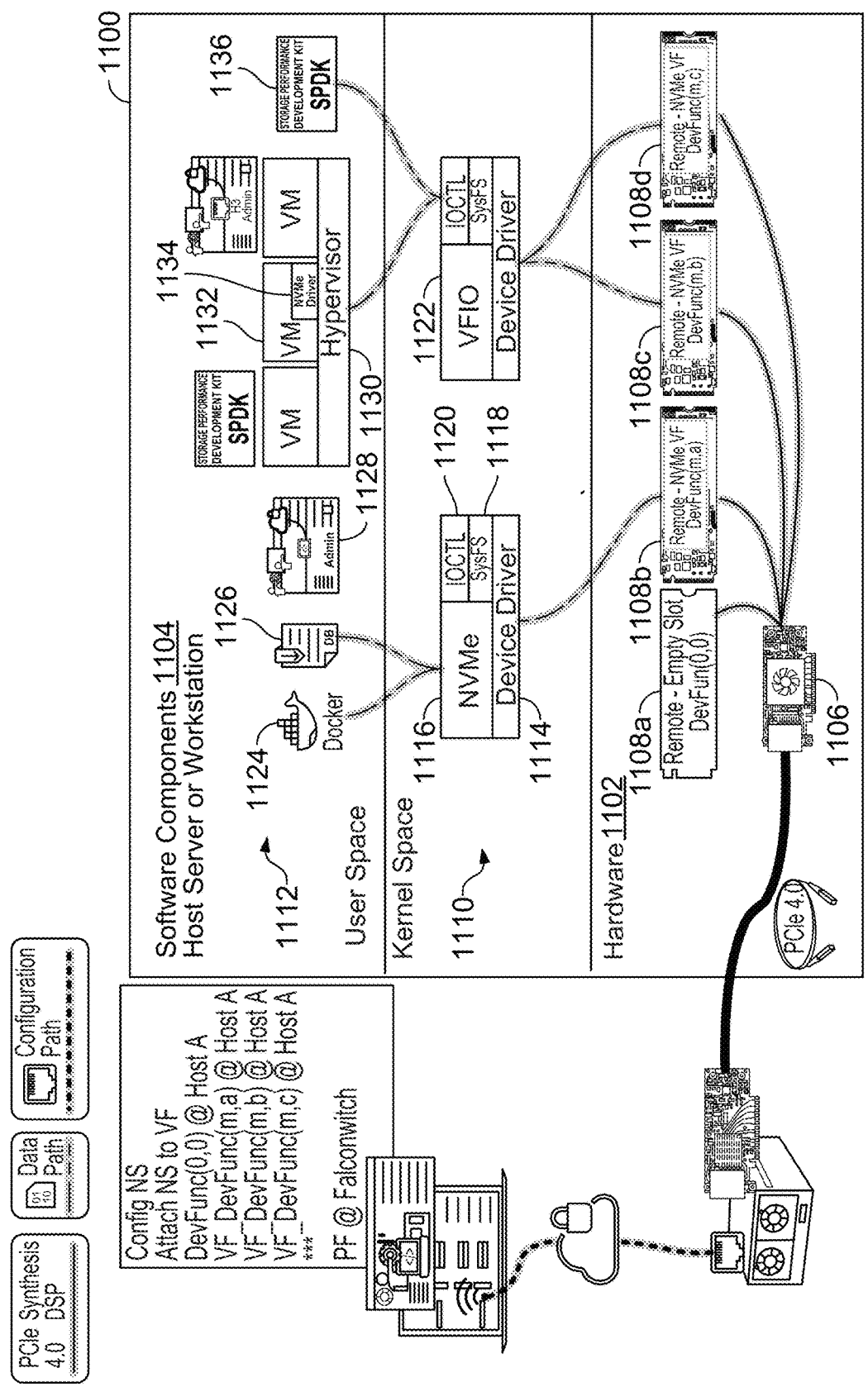
FIG. 11 is a diagram of an example of the hardware and software components of a host server.

Referring to FIG. 11, in some implementations, a host server or workstation 1100 (which can be similar to, e.g., 102, 104, or 106 of FIG. 1) can include hardware components 1102 and software components 1104. The hardware components 1102 include a PCIe switch 1106 that allows the host server 1100 to access the remote NVMe virtual functions. In this example, the PCIe switch 1106 is capable of accessing four remote PCIe slots 1108a, 1108b, 1108c, and 1108d. The first remote PCIe slot 1108a is empty. The second, third, and fourth remote PCIe slots 1108b, 1108c, 1108d are assigned to remote NVMe virtual functions DevFunc(m, a), DevFunc(m, b), and DevFunc(m, c), respectively.

The software components 1104 include a kernel space 1110 and a user space 1112. The kernel space 1110 can include device drivers 1114, such as NVMe drivers 1116 and VFIO drivers 1122. The NVMe drivers can provide a SysFS interface 1118 and an IOCTL interface 1120. The applications in the user space 1112 can issue operation commands to the NVMe drivers 1116 using Sysfs and IOCTL function calls.

The user space 1112 can include, e.g., Docker software 1124, database software 1126, administration software 1128, virtual machine hypervisors 1130, virtual machines 1132, virtual machine NVMe drivers 1134, and storage performance development kits 1136.

For example, the management computer can issue instructions, e.g., configuration namespace, attach namespace to virtual function, assign DevFunc(0,0) to the host server 1100, assign virtual function DevFunc(m,a) to host A, assign virtual function DevFunc(m,b) to the host server 1100, and assign virtual function DevFunc(m,c) to the host server 1100.

Figure 12:
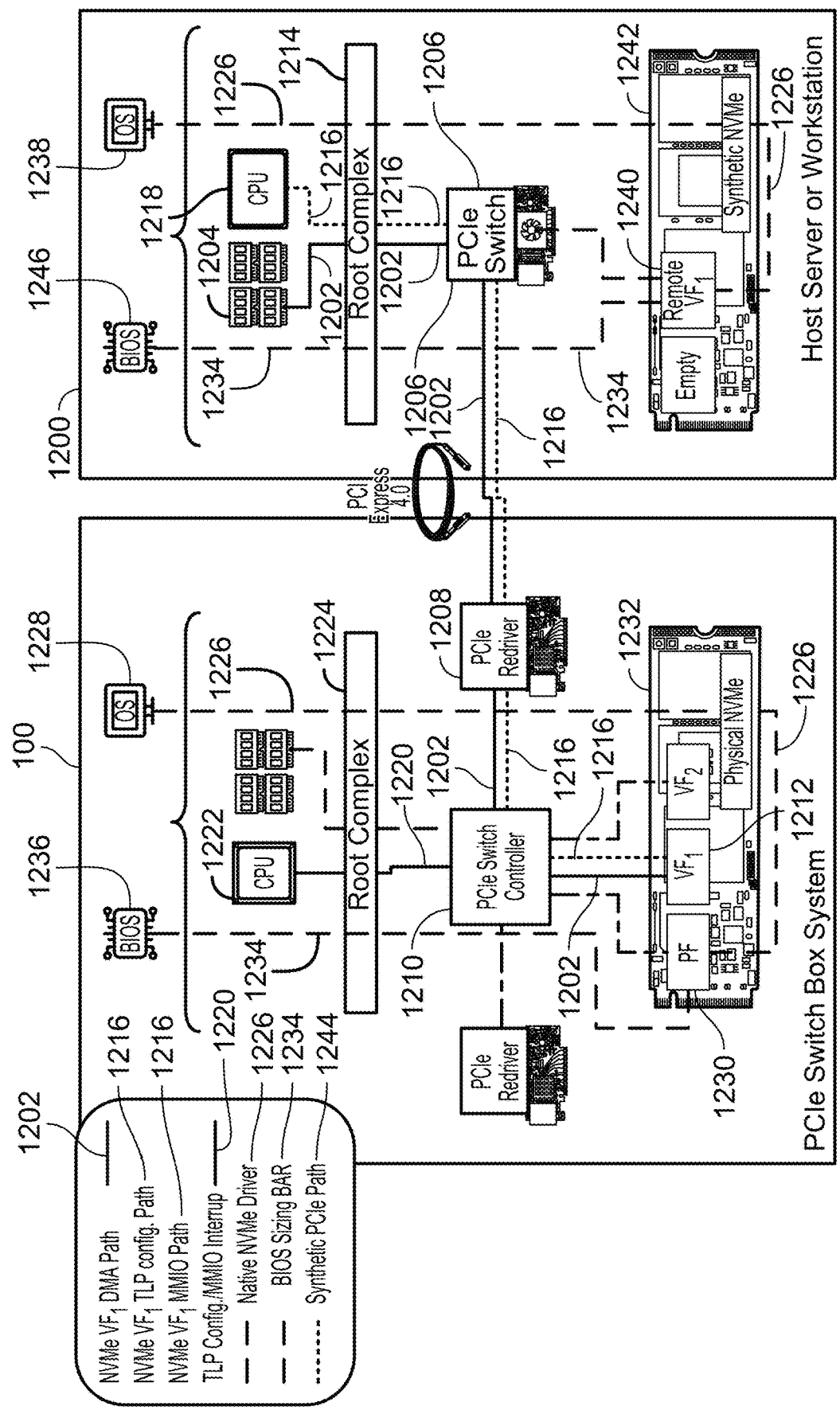
FIG. 12 is a diagram showing examples of signal paths between the PCIe switch box system and the host server.

FIG. 12 shows the signal paths between the PCIe switch box system 100 and a host device 1200, which can be similar to, e.g., 102, 104, 106 of FIG. 1. The signal paths include a NVMe virtual function direct memory access (DMA) path 1202, which extends from the main memory 1204 of the host device 1200 to the root complex 1214 of the host device 1200, from the root complex 1214 to the PCIe switch 1206, from the PCIe switch 1206 to the PCIe redriver 1208, from the PCIe redriver 1208 to the PCIe switch 1210, and from the PCIe switch 1210 to the virtual function 1 1212 of the NVMe device 1232. An NVMe virtual function 1 TLP configuration path and an NVMe virtual function 1 memory-mapped I/O (MMIO) path 1216 extends from the CPU 1218 at the host device 1200 to the root complex 1214 of the host device 1200, from the root complex 1214 to the PCIe switch 1206, from the PCIe switch 1206 to the PCIe redriver 1208, from the PCIe redriver 1208 to the PCIe switch 1210, and from the PCIe switch 1210 to the virtual function 1 1212 of the NVMe device 1232.

A TLP configuration path/memory-mapped I/O (MMIO) interrupt path 1220 extends from the PCIe switch 1210 to the root complex 1224 of the PCIe switch box system 100, and from the root complex 1224 to the management CPU 1222. In the PCIe switch box system 100, a native NVMe driver path 1226 extends from the operating system 1228 to the physical function 1230 of the NVMe device 1232. In the host device 1200, a native NVMe driver path 1226 extends from the operating system 1238 to the remote virtual function 1 1240 of the synthetic NVMe device 1242. In the PCIe switch box system 100, a basic input/output system (BIOS) sizing BAR path 1234 extends from the BIOS 1236 of the PCIe switch box system 100 to the physical function 1230 of the NVMe device 1232. In the host device 1200, a basic input/output system (BIOS) sizing BAR path 1234 extends from the BIOS 1246 of the host device 1200 to the remote virtual function 1 1240 of the synthetic NVMe device 1242. A synthetic PCIe path 1244 extends from the PCIe switch 1206 to the remote virtual function 1240. The PCIe switch 1206 generates a synthetic PCIe tree.

Figure 13:
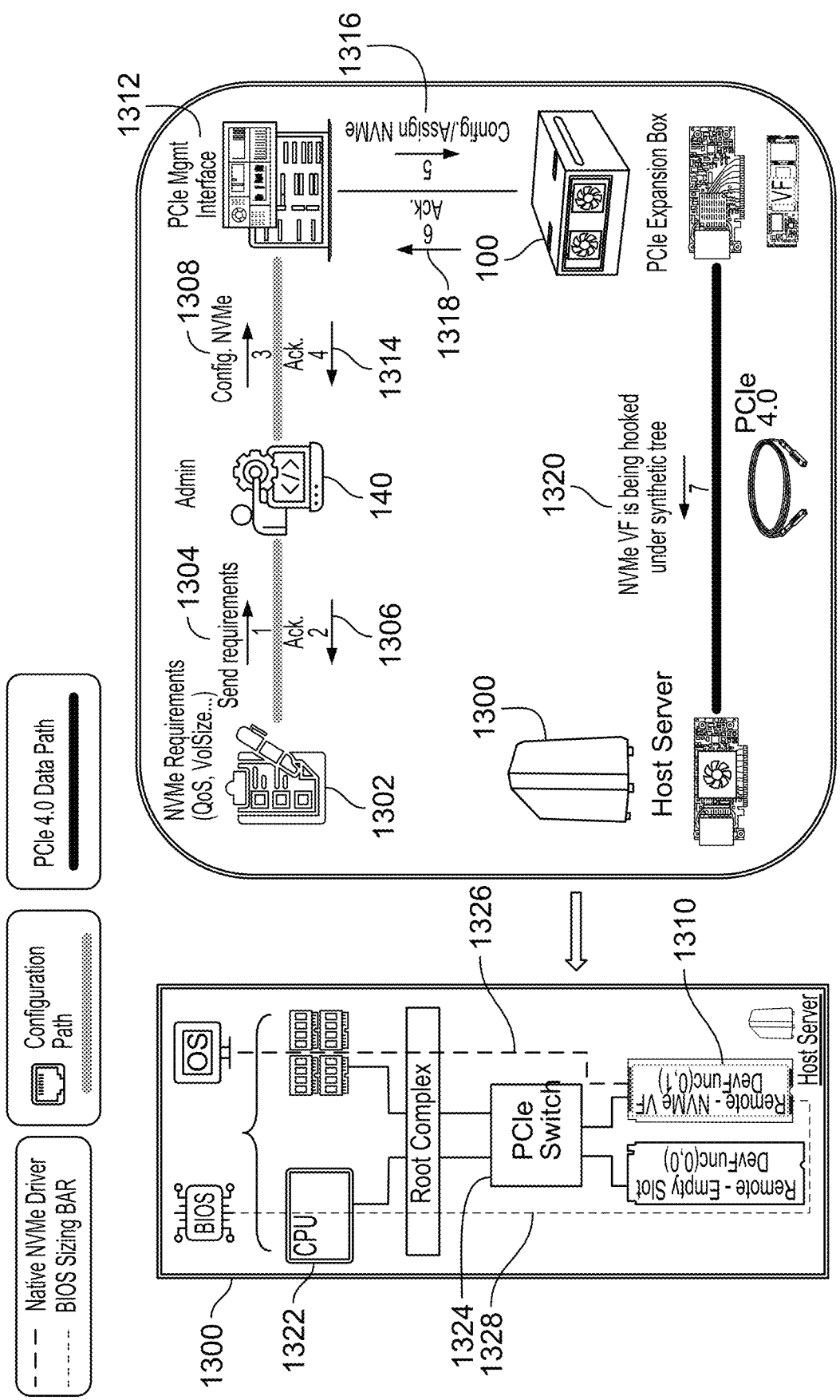
FIG. 13 is a diagram showing an example of various steps of exchange of information between the PCIe switch box system and the host server.

FIG. 13 shows various steps of exchange of information between the PCIe switch box system 100, a host device 1300 (which can be similar to, e.g., 102, 104, 106 of FIG. 1), and the management computer 140 for enabling virtualization of NVMe device functions. An administrator or user of the host device 1300 first specifies the NVMe requirements 1302, such as the quality of service (QoS) and volume size. At step 1, the administrator or the user of the host device 1300 sends 1304 a request to the administrator of the PCIe switch box system 100. At step 2, the administrator acknowledges 1306 the receipt of the request from the host device 100. At step 3, the administrator, by using the PCIe management interface, configures 1308 the NVMe device according to the request from the host device 1300. At step 4, the PCIe management interface 1312 sends 1314 an acknowledgement that the NVMe configuration instructions have been received. At step 5, the PCIe management interface 1312 sends 1316 the instructions for configuring and/or assigning an NVMe device to the PCIe switch box system 100. At step 6, the PCIe switch box system 100 sends 1318 an acknowledgement that the NVMe configuration and/or assignment instructions have been received. At step 7, the NVMe virtual function is hooked 1320 under the synthetic tree. These steps enable the host CPU 1322 to access the remote NVMe virtual function 1310 through the PCIe switch 1324.

The figure also shows the native NVMe driver path 1326 and the BIOS sizing BAR path 1328.

Figure 14:
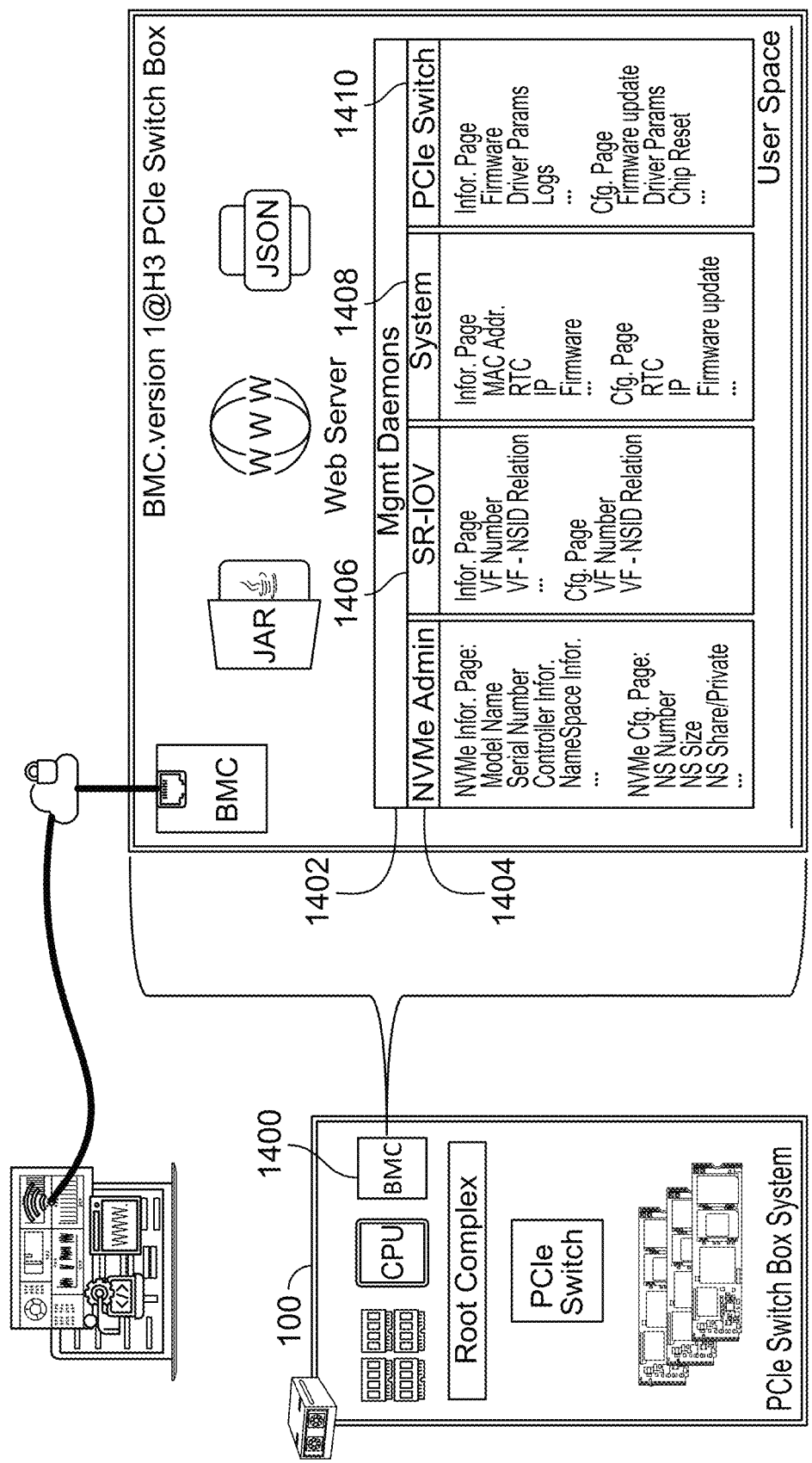
FIGS. 14 and 15 are diagrams of examples of the hardware and software components of the PCIe switch box system.

Referring to FIG. 14, the PCIe switch box system 100 includes a baseboard management controller 1400, which can be a system-on-chip that manages the operation of various components of the PCIe switch box system 100, including monitoring the temperatures of various chips and the fan speeds. The baseboard management controller 1400 allows the remote user to know the parameters of the enclosure of the PCIe switch box system 100. For example, the baseboard management controller 1400 can be implemented using model AST2500 from ASPEED Technology, Inc., Hsinchu City, Taiwan. The baseboard management controller 1400 can store the management daemons 1402 including, e.g., the NVMe administration daemon 1404, the SR-IOV daemon 1406, the system daemon 1408, and the PCIe switch daemon 1410.

Figure 15:
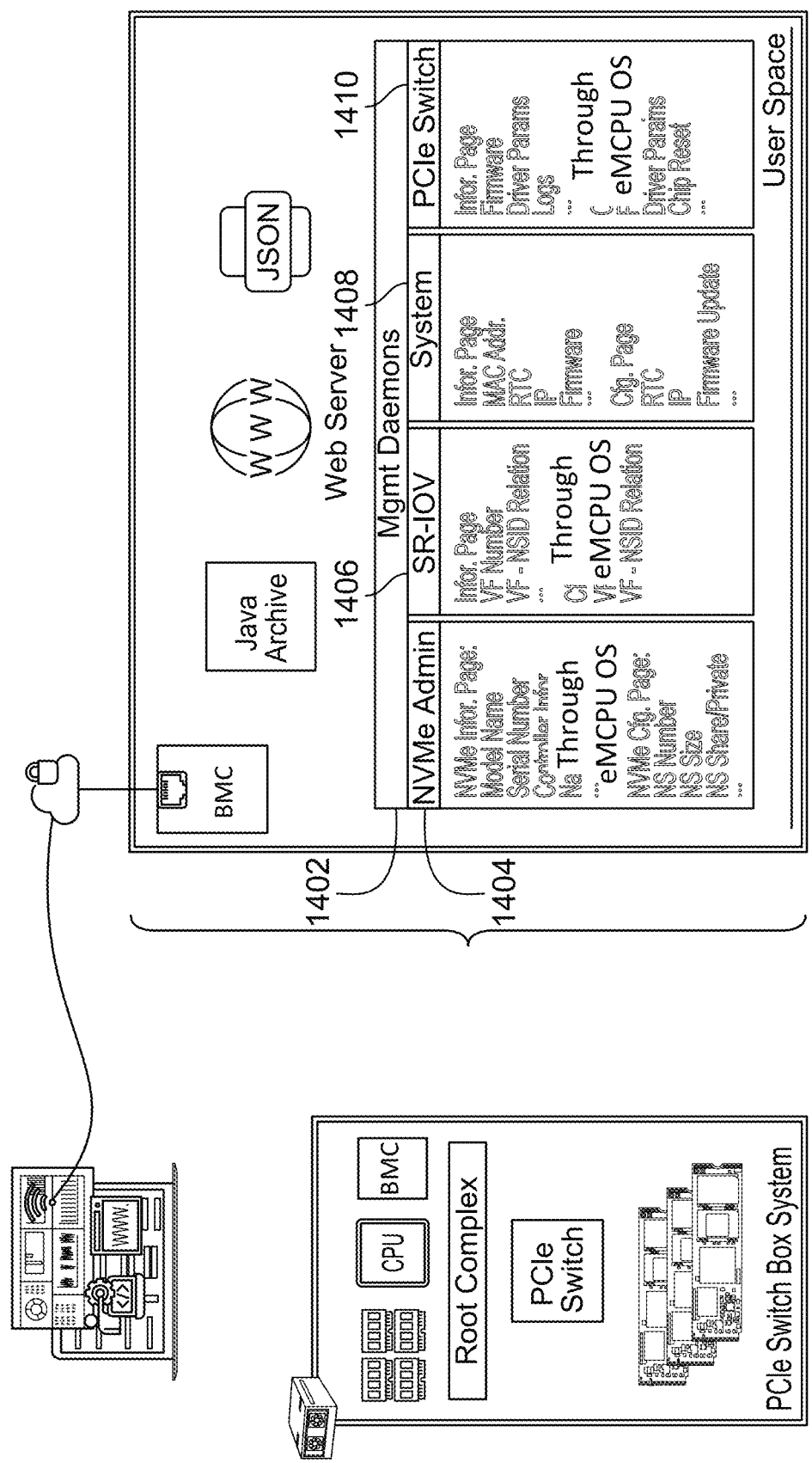

Referring to FIG. 15, some of the management daemons 1402 can be accessed through an external management CPU operation system. In this example, the NVMe administration daemon 1404, the SR-IOV daemon 1406, and the PCIe switch daemon 1410 can be accessed through the external management CPU operation system.

Figure 16:
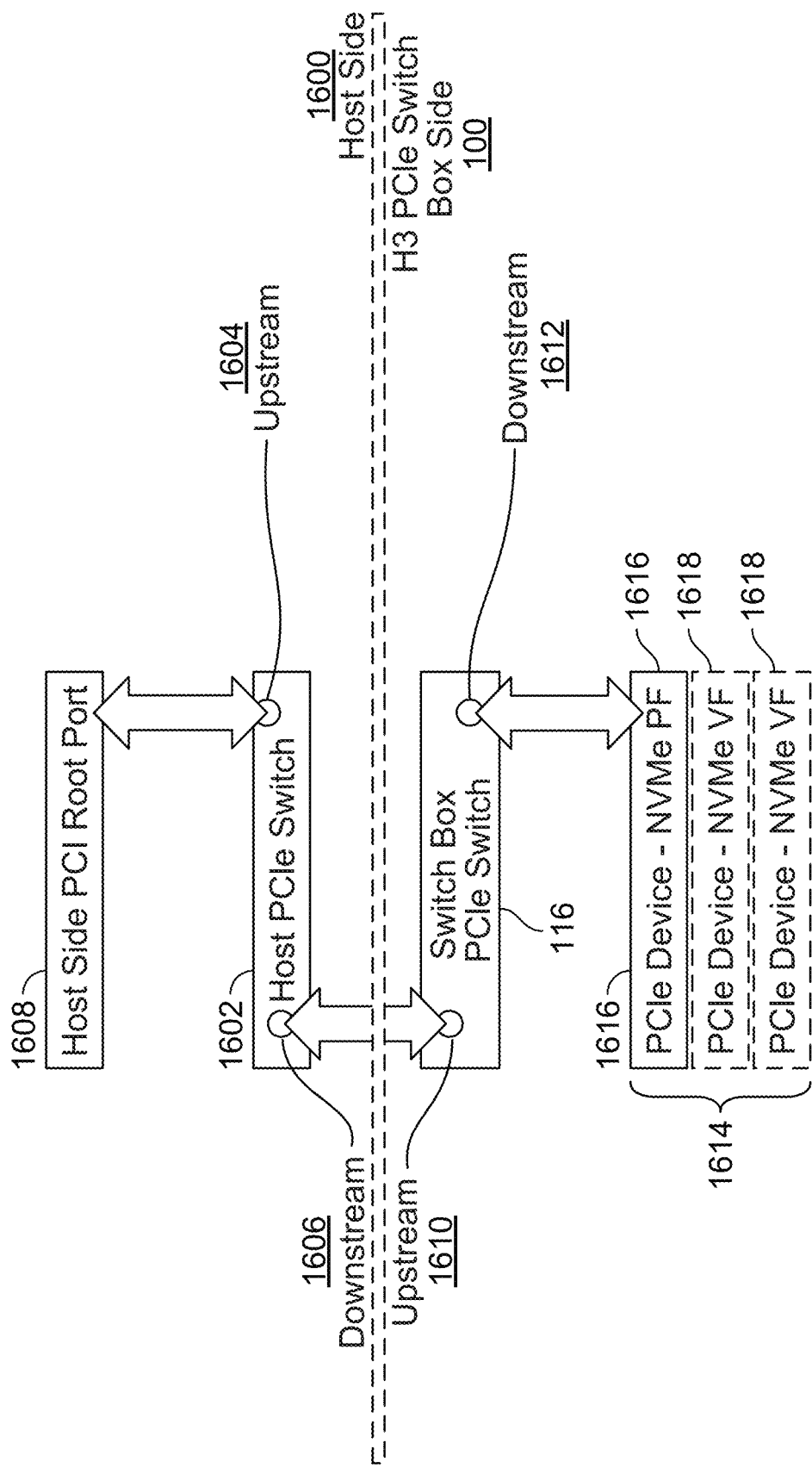
FIG. 16 is a diagram of an example of the hardware architecture of the PCIe switch box system and the host server.

FIG. 16 shows the hardware architecture of the PCIe switch box system 100 and the host device 1600. The PCIe switch box system 100 includes a PCIe switch 116, and the host device 1600 includes a host PCIe switch 1602. For example, the switch box PCIe switch 116 can be the PEX88096 chip, but other PCIe switch integrated circuits can also be used. For example, the host PCIe switch 1602 can be the PEX88032 chip, but other PCIe integrated circuits can also be used.

At the host side 1600, the host PCIe switch 1602 includes an upstream port 1604 and a downstream port 1606. The upstream port 1604 communicates with the host side PCI root port 1608. The downstream port 1606 communicates with an upstream port 1610 of the switch box PCIe switch 116. At the PCIe switch box system 100, the switch box PCIe switch 116 includes the upstream port 1610 and a downstream port 1612. The upstream port 1610 communicates with the downstream port 1606 of the host PCIe switch 1602. The downstream port 1612 of the switch box PCIe switch 116 communicates with the PCIe device 1614, including the NVMe physical function 1616 and the NVMe virtual functions 1618.

Figure 17:
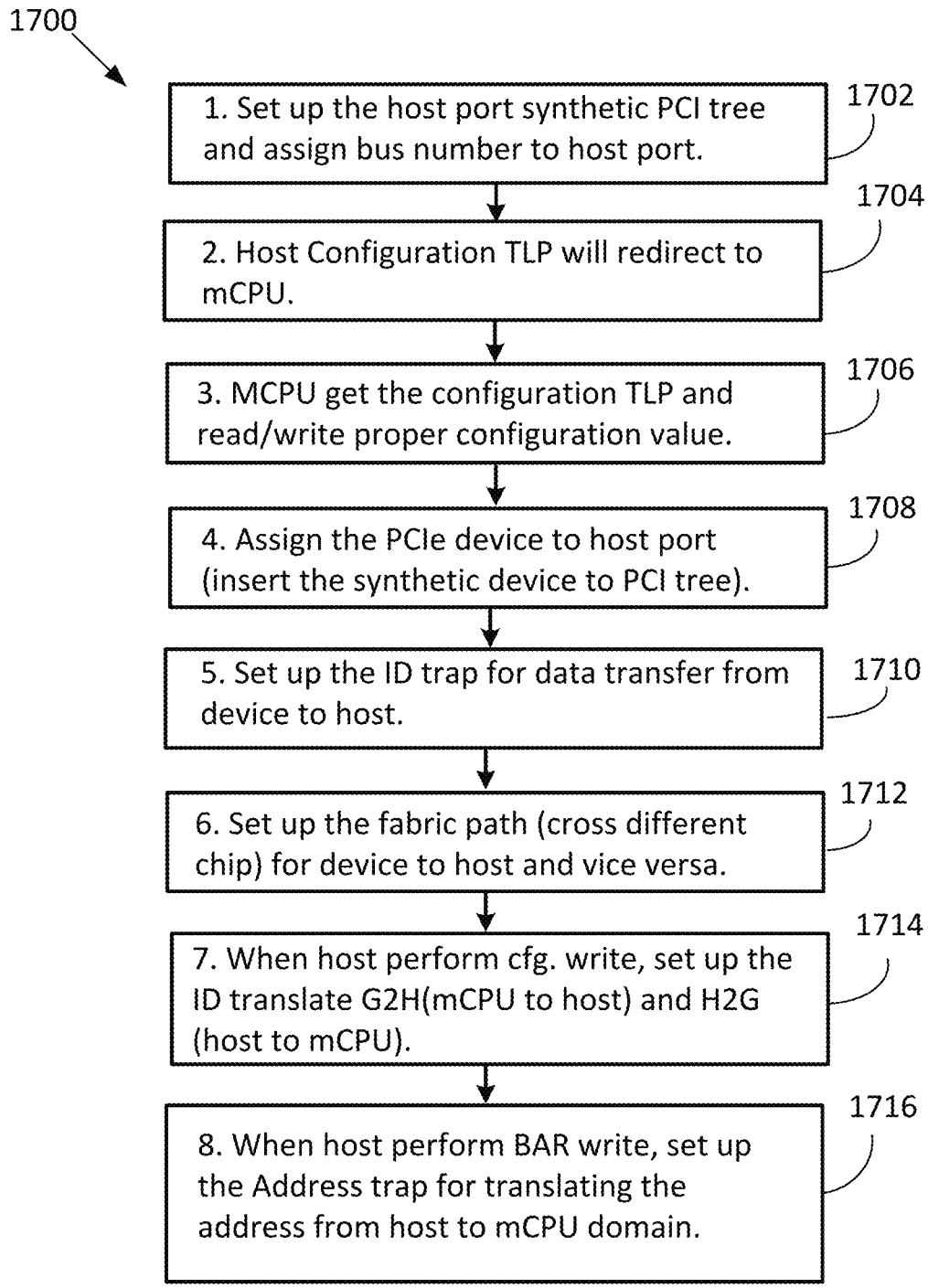
FIGS. 17 to 22 are flow diagrams.

FIG. 17 is a flow diagram of an example of a process 1700 that includes configuration steps performed in the switch box PCIe switch 116 to assign an NVMe SR-IOV virtual function to a host port. Steps 1702 to 1706 are similar to the steps 2402 to 2406 of FIG. 24. Steps 1708 to 1716 are similar to the steps 2418 to 2426 of FIG. 24.

Figure 18:
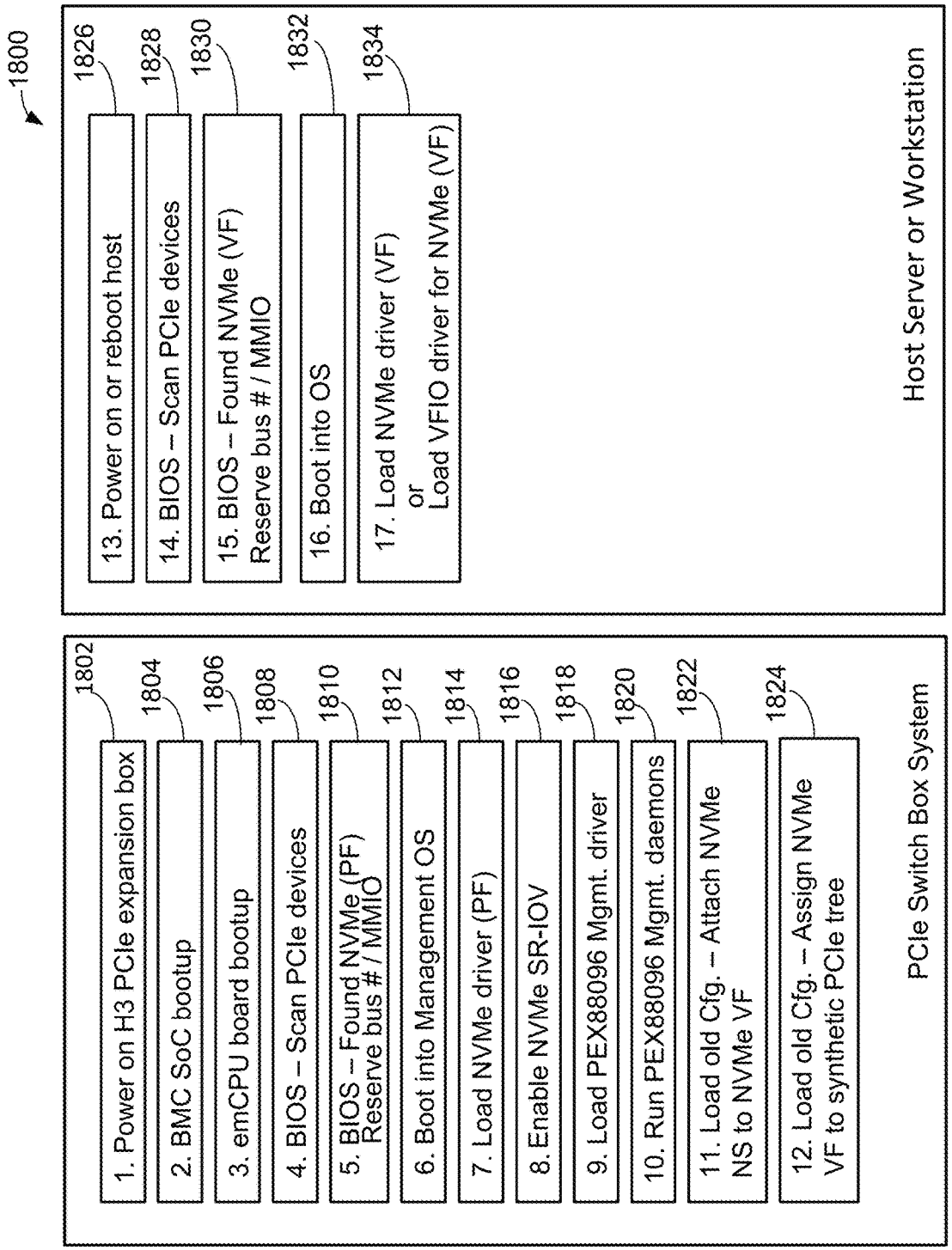

FIG. 18 is a flow diagram of an example of a process 1800 for implementing a boot up sequence when using the PCIe switch box system 100 that includes SR-IOV capable NVMe devices. The process 1800 includes steps 1802 to 1824 that are performed at the PCIe switch box system 100, and steps 1826 to 1834 that are performed at the host server or workstation. At step 1802, the PCIe switch box system 100 is powered on. At step 1804, the baseboard management controller (BMC) system on chip is boot up. For example, the baseboard management controller can be the AST2500 chip. At step 1806, the external management CPU (emCPU) board is boot up. For example, the external management CPU can be the CPU 118 of FIG. 1. At step 1808, the basic input/output system (BIOS) of the PCIe switch box system 100 scans for the PCIe devices installed in the PCIe switch box system 100. At step 1810, the BIOS finds the NVMe physical function(s) and reserves the PCIe bus number(s) and the memory mapped IO. In step 1810, the BIOS configures two PCIe device resources: the bus number and the BAR space. After these PCIe device resources are configured, the management CPU can read from or write to the PCIe device registers. After BIOS scans and identifies an NVMe physical function in step 1808, in step 1810 the BIOS configures the bus number and the BAR space of the NVMe physical function, and enables the management CPU to read from or write to the registers of the NVMe physical function. The NVMe specification defines the relevant registers that need to be configured in step 1810.

At step 1812, the system boots into the management operating system. At step 1814, the management operating system loads the NVMe driver(s) for the physical functions. At step 1816, the operating system enables the NVMe SR-IOV functions of the SR-IOV capable NVMe devices. At step 1818, the operating system loads the management driver of the switch box PCIe switch 116. At step 1820, the operating system executes the switch box PCIe switch 116 management daemons.

In some implementations, the PCIe switch box system 100 has already been configured in which certain namespaces are attached to certain virtual functions, and certain virtual functions are assigned to certain nodes of a synthetic PCIe tree. When the PCIe switch box system 100 is powered down, these configurations are stored in a non-volatile storage device. At step 1822, the previously stored configuration data for the attachment of namespaces are loaded, and the NVMe namespaces are attached to the NVMe virtual functions according to the configuration data. At step 1824, the previously stored configuration data for the assignment of the NVMe virtual functions are loaded, and the NVMe virtual functions are assigned to the nodes of the synthetic PCIe tree according to the configuration data.

At step 1826, the host server is powered on or rebooted. At step 1828, the BIOS of the host server scans for available PCIe devices. At step 1830, the BIOS finds the NVMe virtual function(s) and reserves the bus number and memory mapped IO. After the BIOS scans and identifies the NVMe virtual function in step 1828, in step 1830 the BIOS configures the bus number and the BAR space of the NVMe virtual function to enable the host device side CPU to read from or write to the NVMe virtual function registers. The NVMe specification defines the relevant registers that need to be configured in step 1830. Note that at step 1828, after scanning for available PCIe devices, the host server does not identify the physical function of the SR-IOV capable NVMe device in the PCIe switch box system 100. Rather, the host server identifies the NVMe virtual function on the synthetic PCIe tree generated by the PCIe switch box system 100.

At step 1832, the host server boots into the operating system. At step 1834, the operating system loads the NVMe driver for the virtual function or loads the virtual function IO driver for the NVMe virtual function. There are two ways for the host server operating system to access the NVMe virtual function namespace. For example, when the file system of the host server reads from or writes to the namespace attached to the NVMe virtual function, the file system can use the NVMe driver (which has been developed according to the NVMe specification) to communicate with the NVMe device controller. The NVMe driver can reside in the kernel layer of the host server operating system. As another example, the application programs in the user space can use the virtual function IO drivers (for the NVMe virtual function) residing in the kernel layer of the host server operating system to read from or write to the namespace attached to the NVMe virtual function. For example, the virtual machines can "pass-through" the hypervisor to directly access the virtual function by using the virtual function IO drivers (for the NVMe virtual function) to directly read from or write to the namespace attached to the NVMe virtual function. Note that the PCIe switch box system 100 allows the virtual machines or file systems of multiple host servers to read from or write to the namespace attached to the same NVMe drive, or the controller memory buffer associated with the same NVMe drive. Some host servers can load the kernel layer NVMe driver, and some host servers can load the kernel layer virtual function IO driver for the NVMe virtual function.

Figure 19:
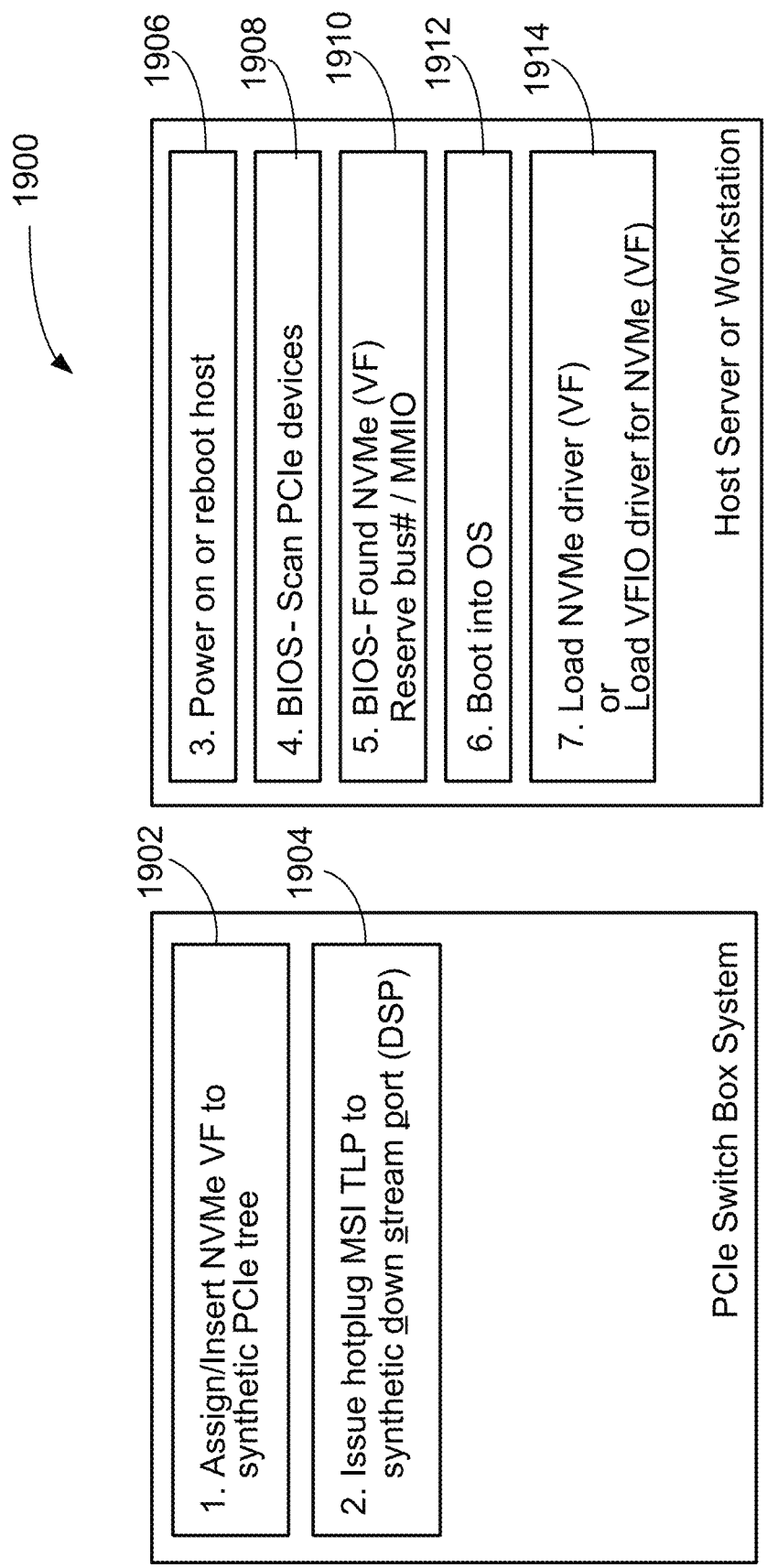

FIG. 19 is an example of a flow diagram of a process 1900 for assigning/inserting an NVMe virtual function to a synthetic PCIe tree when the host operating system does not support NVMe hot plug. In this case, when a new NVMe device is hot plugged into the PCIe switch box system 100, the host server or workstation will not be able to detect the new NVMe device. The NVMe device is not hooked to the downstream port of a synthetic PCIe tree of any host port, so the host server does not detect any change in the PCIe devices. In order for the host server to detect the newly inserted NVMe device, the NVMe device needs to be hooked to the downstream port of the synthetic PCIe tree, and a TLP needs to be sent to the host port to notify the host server about the changes in the PCIe devices. Without the above steps, some host servers may not allocate appropriate PCIe resources to the newly inserted NVMe device. The host server has to reboot in order for the BIOS to allocate appropriate PCIe resources and be able to use the newly added NVMe device. When the NVMe virtual function is hooked to the synthetic PCIe tree, the host server needs to reboot in order to allocate PCIe resources for the NVMe virtual function, such as the bus number of the NVMe virtual function and the MMIO resources. The process 1900 includes steps 1902 and 1904 that are performed at the PCIe switch box system 100, and steps 1906 to 1914 that are performed at the host server or workstation. At step 1902, the switch box PCIe switch 116 assigns or inserts the NVMe virtual function to the synthetic PCIe tree. At step 1904, the switch box PCIe switch 116 issues a hotplug MSI TLP to the synthetic downstream port (DSP). The TLP packet notifies the host server that a PCIe device hotplug event has occurred at a certain downstream port of the synthetic PCIe tree.

At step 1906, the host server is powered on or rebooted. At step 1908, the host server BIOS scans for available PCIe devices. At step 1910, the host server BIOS finds the NVMe virtual functions, and reserves the PCIe bus number and the memory mapped IO. At step 1912, the host server boots into the operating system. At step 1914, the host server operating system loads the NVMe driver for the virtual function, or loads the virtual function IO driver for the NVMe virtual function.

Figure 20:
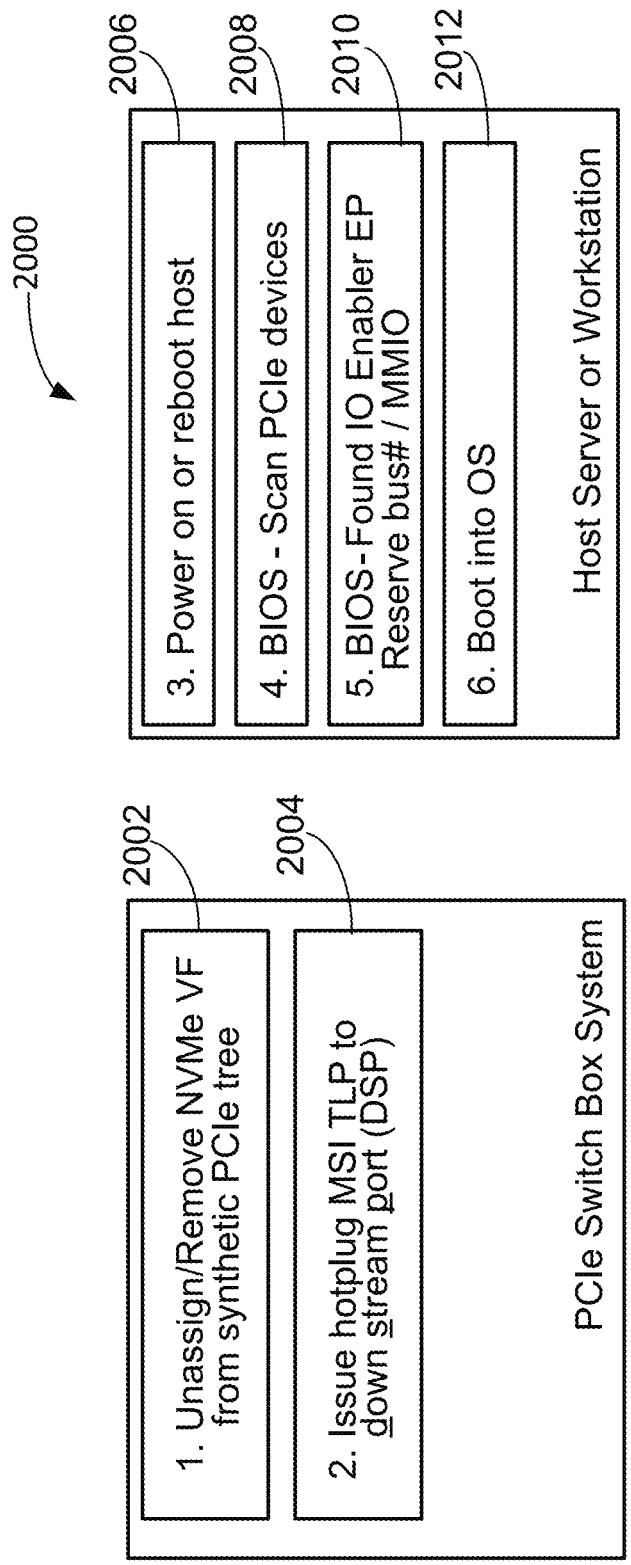

FIG. 20 is a flow diagram of an example of a process 2000 for un-assigning/removing an NVMe virtual function from a synthetic PCIe tree when the host operating system does not support NVMe hot plug. In this case, when an NVMe device is unassigned from the host server or removed from the PCIe switch box system 100, the host server will not detect that the NVMe device has been unassigned or removed. The process 2000 is performed to enable the host server to accurately determine the available PCIe devices. The process 2000 includes steps 2002 and 2004 that are performed at the PCIe switch box system 100, and steps 2006 to 2012 that are performed at the host server or workstation. At step 2002, the NVMe virtual function is unassigned or removed from the synthetic PCIe tree. At step 2004, the switch box PCIe switch 116 issues a hotplug MSI TLP to the synthetic downstream port (DSP).

At step 2006, the host server is powered on or rebooted. At step 2008, the host server BIOS scans for available PCIe devices. At step 2010, the host server BIOS finds the IO enabler end point, and reserves the PCIe bus number and the memory mapped IO. When the NVMe virtual function is removed from the synthetic PCIe tree, the vacant position is filled in using an IO enabler end point PCIe device. The function of the IO enabler end point is to reserve appropriate PCIe resources (e.g., the bus number and BAR space) so that when the host server BIOS allocates resources for the synthetic PCIe tree generated by the PCIe switch box system 100, the host server BIOS can allocate the bus number and the BAR space to the IO enabler end point. When an NVMe virtual function is added to the synthetic PCIe tree, the IO enabler end point can be removed from the synthetic PCIe tree and be replaced by the NVMe virtual function. This way, the host server operating system does not need to reboot in order for the BIOS to configure the PCI resource of the NVMe virtual function. At step 2012, the host server boots into the operating system.

Figure 21:
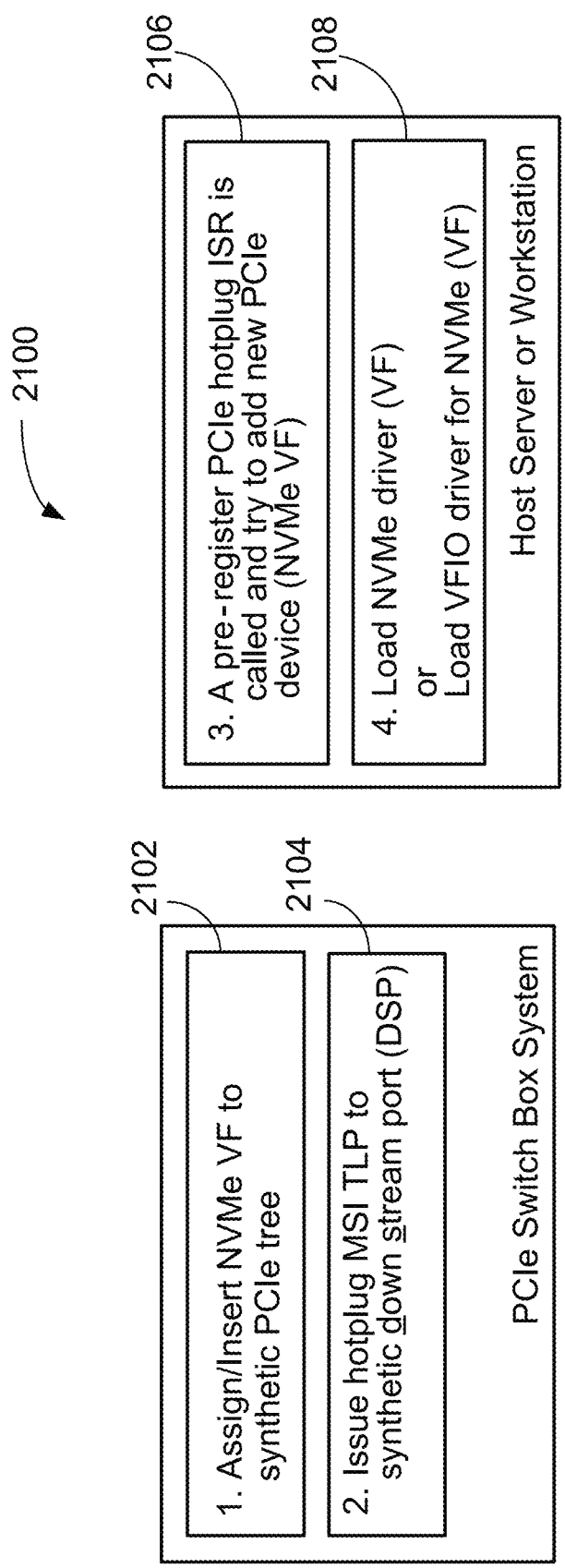

FIG. 21 is a flow diagram of an example of a process 2100 for assigning/inserting an NVMe virtual function to a synthetic PCIe tree when the host operating system supports NVMe hot plug. When a new NVMe device is hot plugged into the PCIe switch box system 100, the host server or workstation, the NVMe device is initially not hooked to the downstream port of a synthetic PCIe tree of any host port, so the host server does not detect any change in the PCIe devices. In order for the host server to detect the newly inserted NVMe device, the NVMe device needs to be hooked to the downstream port of the synthetic PCIe tree, and a TLP needs to be sent to the host port to notify the host server about the changes in the PCIe devices. The process 2100 includes steps 2102 and 2104 that are performed at the PCIe switch box system 100, and steps 2106 and 2108 that are performed at the host server or workstation. Steps 2102 and 2104 are similar to steps 1902 and 1904 of FIG. 19. At step 2106, the host server operating system calls a pre-registered PCIe hotplug interrupt service routine (ISR) and tries to add a new PCIe device (the NVMe virtual function). In this example, the host server operating system uses a previously registered PCIe hotplug interrupt service routine to allocate system resources to any PCIe device (e.g., NVMe virtual function) newly added to the synthetic PCIe tree. Step 2108 is similar to step 1914 of FIG. 19.

Figure 22:
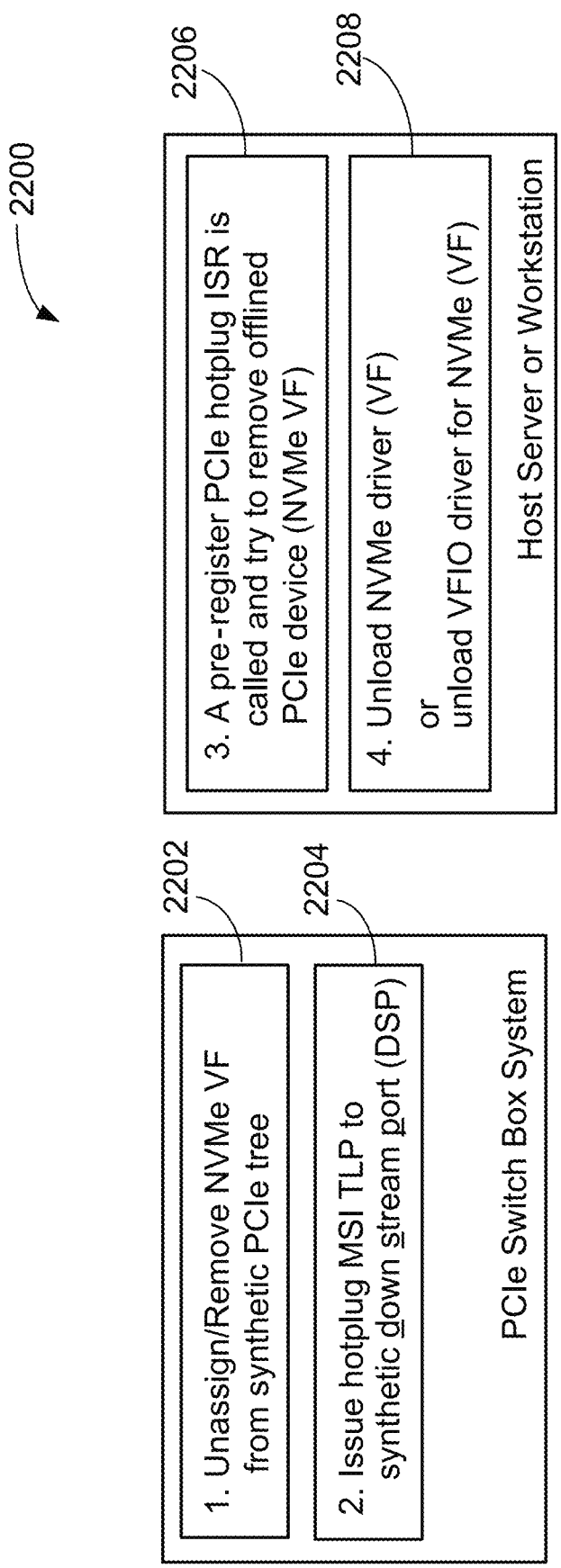

FIG. 22 is a flow diagram of an example of a process 2200 for un-assigning/removing an NVMe virtual function to a synthetic PCIe tree when the host operating system supports NVMe hot plug. In this case, when an NVMe device is unassigned from the host server or removed from the PCIe switch box system 100, the host server can detect the unassignment or removal of the NVMe device without rebooting. The process 2200 includes steps 2202 and 2204 that are performed at the PCIe switch box system 100, and steps 2206 and 2208 that are performed at the host server or workstation. Steps 2202 and 2204 are similar to steps 2002 and 2004 of FIG. 20. At step 2206, the host server operating system calls a pre-register PCIe hotplug ISR and tries to remove the offlined PCIe device (the NVMe virtual function). Step 2208 is similar to step 1914 of FIG. 19.

Figure 23:
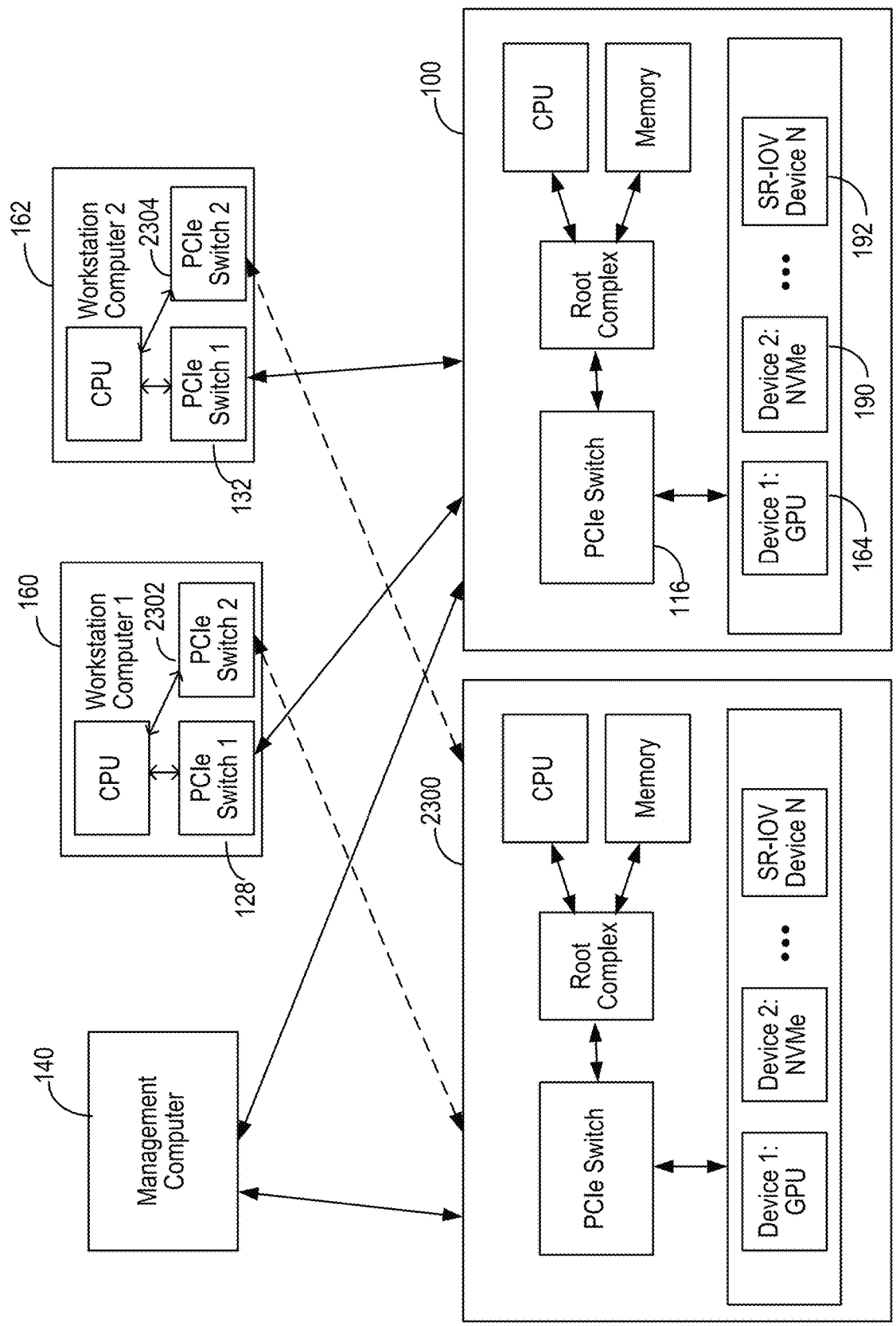
FIG. 23 is a block diagram of a system that includes two PCIe switch box systems to provide fail-safe redundancy.

Referring to FIG. 23, in some implementations, two or more PCIe switch box systems 100, 2300 can provide redundancy so that if one PCIe switch box system fails, the host devices 160, 162 can still access the SR-IOV functions provided by the other PCIe switch box system. In this example, each host device includes two PCIe switches for interfacing with the two PCIe switch box systems. For example, the host device 160 includes a first PCIe switch 128 for interfacing with the switch box 100, and a second PCIe switch 2302 for interfacing with the switch box 2300. The host device 162 includes a first PCIe switch 132 for interfacing with the switch box 100, and a second PCIe switch 2304 for interfacing with the switch box 2300.

Initially, the PCIe switch box system 100 is the primary system, and the host devices 160 and 162 accesses the virtualized PCIe device physical and virtual functions provided by the PCIe switch box system 100. The management computer 140 monitors the health status of the PCIe switch box system 100 and 2300. If the PCIe switch box system 100 fails, the management computer 140 notifies the host devices 160 and 162 to change to using the PCIe switch box system 2300.

For example, the PCIe devices and PCIe links described in this document can comply with the PCI Express® 3.0, 4.0 Base Specifications, which are incorporated by reference. In some implementations, the PCIe switch box system 100 can include two or more PCIe switch controllers to allow more host devices to access more SR-IOV capable PCIe devices. The PCIe links between the PCIe switch box system 100 and the host devices (e.g., 102, 104, 106 of FIG. 1) can have lengths of, e.g., a few feet, tens of feet, or hundreds of feet. For example, the PCIe switch box system 100 and the host servers can be rackmount devices, the PCIe switch box system 100 and the host servers can be mounted on a same rack, in which the PCIe switch box system 100 host PCIe resources (e.g., GPU, NVMe storage) for the host servers in the rack.

In some implementations, the switch box system can work with devices that comply with standards other than the PCI Express and NVM Express standards, e.g., new standards that enhance or replace the PCIe and NVMe standards.

In some implementations, the software modules and drivers for implementing the PCIe switch box system and the management computer can be provided on computer-readable media (e.g., RAM, ROM, SDRAM, hard disk, optical disk, and flash memory). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., general purpose microprocessors, special purpose microprocessors, digital signal processors, single-core or multi-core processors, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and Blu-ray BD-ROM disks. The processor and the memory can be supplemented by, or incorporated in, ASICs (application-specific integrated circuits).

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or in sequential order, to achieve desirable results. In certain implementations, multitasking and parallel processing may be advantageous.

Although some examples have been discussed above, other implementations and applications are also within the scope of the following claims. For example, the hosts (e.g., 160, 162) can be different from what is described above.

In some implementations, the NVMe solid state drives can be replaced with other types of solid state drives. The non-volatile memory used in the solid state drives can be based on various types of technology, including e.g., single-level cell flash memory, triple-level cell flash memory, and/or multi-level cell flash memory.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. An apparatus comprising:
a communication interface configured to be electrically connected to a block-addressable non-volatile storage device that supports single-root input/output virtualization, wherein the block-addressable non-volatile storage device has a plurality of namespaces, each namespace represents an amount of storage space of the storage device, and the block-addressable non-volatile storage device enables the namespaces to be attached to and accessed by one or more physical functions and a plurality of virtual functions;
a switch device configured to communicate with host devices, wherein the switch device is configured to assign one or more virtual functions to each host device, and enable the host devices to access the namespaces using the assigned virtual functions,
wherein the block-addressable non-volatile storage device comprises a storage device controller that is configured to set a first namespace to a private state during a first period of time, and set the first namespace to a shared state during a second period of time, wherein when the first namespace is set to the private state, the first namespace is accessible to a single virtual function, and when the first namespace is set to the shared state, the first namespace is accessible to multiple virtual functions;

a management central processor unit (CPU); and a memory device storing management software that when executed by the management CPU causes the management CPU to configure the switch device and the storage device controller to enable the host devices to access the namespaces using the virtual functions.

2. The apparatus of claim 1 wherein the switch device comprises a PCIe switch, and the one or more block-addressable non-volatile storage devices comprise solid state drives.

3. The apparatus of claim 2 wherein the switch device communicates with the host devices through PCIe links.

4. The apparatus of claim 3 in which at least one of the host devices comprises at least one of a personal computer or a server computer, the at least one of a personal computer or a server computer includes a PCIe interface card that communicates with the PCIe switch through the PCIe link.

5. The apparatus of claim 1 wherein the management CPU is designed to receive storage requirements associated with a first host device, configure the one or more block-addressable non-volatile storage devices according to the storage requirements, including generating a first namespace according to the storage requirements, attaching the first namespace to one or more virtual functions, and assigning one or more virtual functions to the first host device.

6. The apparatus of claim 5 wherein the switch device comprises a PCIe switch that is configured to provide a PCIe device tree to the first host device, and the PCIe device tree includes information about the assigned one or more virtual functions.

7. The apparatus of claim 5 wherein information about the first namespace and the one or more virtual functions assigned to the first host device is stored in the memory device.

8. The apparatus of claim 7 wherein the information about the first namespace and the one or more virtual functions assigned to the first host device is maintained in the memory device when the first host device is rebooted, and after the first host device is rebooted, the PCIe switch is configured to provide the PCIe device tree to the first host device, and the PCIe device tree includes the information about the assigned one or more virtual functions.

9. The apparatus of claim 1, comprising two or more switch devices and two or more block-addressable non-volatile storage devices that support single-root input/output virtualization, wherein each switch device enables a set of host devices to access a set of virtual functions supported by the block-addressable non-volatile storage devices.

10. The apparatus of claim 9 wherein each block-addressable non-volatile storage device includes a storage device controller, and the management software when executed by the management CPU causes the management CPU to configure the two or more switch devices and the two or more storage device controllers to enable the host devices to access namespaces of the block-addressable non-volatile storage devices using the virtual functions.

11. A system comprising the apparatus of claim 1, further comprising:

the block-addressable non-volatile storage device;

the host devices, wherein each host device comprises a central processing unit and a local switch device; and communication links between the local switch devices of the host devices and input/output ports of the apparatus;

wherein each host device comprises virtual machines, and each virtual machine accesses a namespace in the block-addressable non-volatile storage device through the local switch device of the host device, the switch device of the apparatus, and a communication link between the local switch device of the host device and the switch device of the apparatus.

12. The system of claim 11 wherein the local switch device comprises a PCIe switch, the switch device of the host device comprises a PCIe switch of the host device, and the communication link between the local switch device of the host device and the switch device of the apparatus comprises a PCIe link.

13. An apparatus comprising:

one or more PCIe interfaces configured to be electrically coupled to one or more single root input/output virtualization (SR-IOV) capable PCIe devices, wherein each SR-IOV capable PCIe device has at least one of (i) one or more namespaces, or (ii) one or more controller memory buffers, wherein each namespace represents an amount of storage space of the SR-IOV capable PCIe device, each controller memory buffer represents a memory space of the SR-IOV capable PCIe device, and the SR-IOV capable PCIe device provides one or more physical functions and a plurality of virtual functions that can access at least one of (i) one or more namespaces, or (ii) one or more partitions of one or more controller memory buffers; and a PCIe switch configured to communicate with a plurality of host devices, wherein the PCIe switch is configured to assign one or more virtual functions to each host device, and enable the host devices to access at least one of (i) one or more namespaces, or (ii) one or more partitions of one or more controller memory buffers, through the assigned virtual functions;

wherein the SR-IOV capable PCIe device is configured to attach at least one of (i) one or more namespaces, or (ii) one or more partitions of one or more controller memory buffers to each virtual function, set at least one of (i) at least one namespace, or (ii) at least one partition of at least one controller memory buffer, to a shared state and allow multiple host devices to access at least one of (i) the shared namespace, or (ii) the shared partition of the controller memory buffer, using respective assigned virtual functions;

a management central processor unit (CPU); and a memory device storing management software that when executed by the management CPU causes the management CPU to configure the PCIe switch and the SR-IOV capable PCIe devices to enable the host devices to access at least one of (i) the one or more namespaces, or (ii) the one or more controller memory buffers, using the virtual functions.

14. The apparatus of claim 13, comprising the one or more single root input/output virtualization capable PCIe devices, wherein each single root input/output virtualization capable device comprises at least one of an NVMe solid state drive, a redundant array of independent disk (RAID) device, a field programmable gate array (FPGA) device, a network interface card, or a graphics processing unit (GPU) card.

15. The apparatus of claim 13, comprising the one or more single root input/output virtualization capable PCIe devices, wherein each SR-IOV capable PCIe device comprises one or more namespaces, the SR-IOV capable PCIe device provides one or more physical functions and a plurality of virtual functions that can access the one or more namespaces, and
> wherein the PCIe device comprises a controller that is configured to attach one or more namespaces to each virtual function, and enable the host devices to access the one or more namespaces through the assigned virtual functions.

16. The apparatus of claim 13, comprising the one or more single root input/output virtualization capable PCIe devices, wherein each SR-IOV capable PCIe device comprises one or more controller memory buffers, the SR-IOV capable PCIe device provides one or more physical functions and a plurality of virtual functions that can access the one or more controller memory buffers, and
> wherein the PCIe device comprises a controller that is configured to assign one or more controller memory buffers to each virtual function, and enable the host devices to access the one or more controller memory buffers through the assigned virtual functions.

17. The apparatus of claim 13, comprising the one or more single root input/output virtualization capable PCIe devices, wherein at least one SR-IOV capable PCIe device comprises a controller memory buffer that has multiple partitions, the SR-IOV capable PCIe device provides one or more physical functions and a plurality of virtual functions that can access the partitions of the controller memory buffer, and
> wherein the PCIe device comprises a controller that is configured to assign one or more partitions of the controller memory buffer to each virtual function, and enable the host devices to access the one or more partitions of the controller memory buffer through the assigned virtual functions.

18. The apparatus of claim 13, comprising two or more PCIe switches and two or more single root input/output virtualization (SR-IOV) capable PCIe devices that support single-root input/output virtualization, wherein each SR-IOV capable PCIe device has at least one of (i) one or more namespaces, or (ii) one or more controller memory buffers, each PCIe switch enables each of the host devices to access one or more virtual functions supported by the single root input/output virtualization (SR-IOV) capable PCIe devices.

19. The apparatus of claim 18 wherein each single root input/output virtualization (SR-IOV) capable PCIe device includes a device controller, and the management software when executed by the management CPU causes the management CPU to configure the two or more PCIe switches and the two or more device controllers to enable the host devices to access namespaces and controller memory buffers of the single root input/output virtualization capable PCIe devices using the virtual functions.

20. The apparatus of claim 1, comprising the block-addressable non-volatile storage device.

* * * * *